United States Patent
Gerber

(10) Patent No.: US 10,636,042 B2
(45) Date of Patent: Apr. 28, 2020

(54) METHOD, SYSTEM, COMPUTER PROGRAM PRODUCT AND PROGRAM FOR CREATING AND USING ACTIONABLE JOURNEY MAPS

(71) Applicant: THUNDERHEAD LIMITED, London (GB)

(72) Inventor: Ray Gerber, London (GB)

(73) Assignee: THUNDERHEAD (ONE) LIMITED, London (GB)

(*) Notice: Subject to any disclaimer, the term of this patent is extended or adjusted under 35 U.S.C. 154(b) by 678 days.

(21) Appl. No.: 14/710,832

(22) Filed: May 13, 2015

(65) Prior Publication Data
US 2015/0332290 A1    Nov. 19, 2015

(30) Foreign Application Priority Data

May 14, 2014  (GB) .................................. 1408572.4

(51) Int. Cl.
*G06Q 30/02*  (2012.01)

(52) U.S. Cl.
CPC ......... *G06Q 30/02* (2013.01); *G06Q 30/0201* (2013.01)

(58) Field of Classification Search
CPC ........ G06Q 10/00; G06Q 50/00; G06Q 40/00; G06F 17/60
USPC ...................................................... 705/7.29
See application file for complete search history.

(56) References Cited

U.S. PATENT DOCUMENTS

| | | | |
|---|---|---|---|
| 5,978,773 A * | 11/1999 | Hudetz | G06F 17/30879 705/23 |
| 9,916,564 B1 * | 3/2018 | Johns | G06Q 10/10 |
| 2007/0294096 A1 * | 12/2007 | Randall | G06Q 30/0267 705/1.1 |
| 2008/0229214 A1 * | 9/2008 | Hamilton | G06Q 10/06 715/751 |
| 2011/0218847 A1 * | 9/2011 | Razzaque | G06Q 30/02 705/14.16 |
| 2013/0173612 A1 * | 7/2013 | Shah | G06F 16/24578 707/731 |
| 2015/0067106 A1 * | 3/2015 | Jaynes | H04L 65/4038 709/219 |
| 2015/0161624 A1 * | 6/2015 | Heath | G06Q 30/0201 705/7.29 |

FOREIGN PATENT DOCUMENTS

WO    WO2013/043672 A1    3/2013

OTHER PUBLICATIONS

"Experience maps user journey and more", Mar. 2013, UX Lady, pp. 1-11 (Year: 2013).*

* cited by examiner

*Primary Examiner* — Romain Jeanty
(74) *Attorney, Agent, or Firm* — Finnegan, Henderson, Farabow, Garrett & Dunner, LLP

(57) ABSTRACT

The present invention describes a method, a system, a computer program product and a computer program for creating and using a journey map and for associating user interactions with a system such as a computer system to steps of the journey map. Embodiments of the invention relate to user interactions with an organisation across a range of different communication channels and associating these interactions with steps of a journey map.

15 Claims, 29 Drawing Sheets

METHOD, SYSTEM, COMPUTER PROGRAM PRODUCT AND PROGRAM FOR CREATING AND USING ACTIONABLE JOURNEY MAPS

FIELD OF THE INVENTION

The present invention relates to a method, a system, a computer program product and a computer program for creating and using a journey map and for associating user interactions with a system to steps of the journey map. Embodiments of the invention relate to user interactions with a system of an organisation across a range of different communication channels and associating these interactions with steps of a journey map.

BACKGROUND

In today's business world, there are a number of ways a person can interact with an organisation (e.g a business). These ways include electronic means such as website, or email or more traditional communication means such as calling a call centre or using postal services. Typically a person interacts with an organisation by any one of these means or channels, and only basic information is retained by that organisation to support a user who switches between channels of communications. Users, either customers or potential customers, may wish to acquire information or to use or get a service or to purchase products and/or services. The customer's sequence of interactions or "journey" represents the customer's behaviour and purchase experience and a map can be drawn known as a journey map that can show how a user may interact with an organisation.

Such a static journey maps can be created using Microsoft® PowerPoint® or Excel® or other software packages which are not adapted to dynamically create, adapt or monitor a journey map.

A recent publication (WO20131043672A1) discloses a method of predicting whether a customer is on a certain journey using predictive analytics. In this document, the construction of customers' journeys is based on the analysis of past customers' interactions. This document relies on the existence of previously defined journeys that may match a customer's intent. In this document, the journeys are the preferred paths that a business intends the user to take either within a channel or across multiple channels. When a user deviates from the preferred path, then an action is triggered.

BRIEF SUMMARY OF THE INVENTION

In an embodiment of the present invention, there is provided a method of creating a journey map and of dynamically creating mappings or associations between the user's monitored activities and the journey steps. One or more of the user interactions in a journey are monitored by respective listener elements. The journey steps may be predefined. The map is therefore an actionable journey map. The actionable journey map is executable and can be updated dynamically in real time based on the user's behaviour. The mapping of the customer's behaviour and the journey steps enable tracing a history of the user's behaviour with respect to journey steps. Moreover, the possible actions that are mapped to the predefined steps are changeable once the map has been drawn. The maps may be able to take into account the activities of the customer as the customer moves along the journey and may be updatable in real time as the customer/riser is moving along his journey.

For the avoidance of doubt, the terms "including" and "comprising" as used throughout this specification are not to be construed as meaning "consisting only of" but are to be construed as non-exclusive terms.

The present invention provides, in a first aspect, a computer-implemented method of creating a journey map representative of a user journey comprising at least one journey step, the method comprising monitoring a user's activity and further comprising providing information relating to the user's activity for associating the user's monitored activity to the at least one journey step.

In one embodiment, the method includes checking whether the user's monitored activity can be associated with the at least one journey step by comparing attributes of the user's activity and attributes of the at least one journey step.

In one embodiment, if the user's monitored activity can be associated with the at least one journey step, associating the user's activity to the at least one journey step.

In one embodiment, associating the user's activity to the at least one journey step comprises linking on the journey map a representation of the user's activity with the journey step associated with the user's activity.

In one embodiment, when the user's monitored activity is not associated with a journey step, sending a signal for indicating the lack of association between the user's activity and the at least one journey step.

In one embodiment, monitoring the user's activity comprises listening to the user's activity by means of a listener. In one embodiment, the listener is a software application capable of capturing the user's actions across a plurality of media and/or channels.

In one embodiment, monitoring a user's activity comprises listening to the user's action over a touch-point.

In one embodiment, information relating to the user's activity is incorporated into a user's profile.

In one embodiment, upon detection of a lack of association between a user's activity and the at least one journey step, the method includes consulting the user's profile for directing or guiding the user to an activity that will be associable with the at least one journey step.

In one embodiment, directing the user comprises selecting an attribute of the user's profile to identify activity information for the user, and for requesting and retrieving identified information.

In one embodiment, the information relating to the user's monitored activity and information of context from data analytics are combined for associating the user's monitored activity to the at least one journey step.

In one embodiment, the association between a user's activity and the at least one journey step is valid for a predetermined duration of time or until a timer expires or until the user's monitored activity changes.

In one embodiment, the method comprises removing the association when the time expires and the user's monitored activity is not changed or renewed.

In one embodiment, the method comprises inferring a user's position in the journey by comparing the user's profile information including the user's monitored activity with attributes of the at least one journey step.

The aforementioned method may be computer-implemented and one or more of the steps can be performed by a computing apparatus.

According to an aspect of the invention, there is provided a computer system and means for creating a journey map having at least one journey step, means for monitoring a user's activity and means for associating the user's activity to the at least one journey step.

According to an aspect of the invention, there is provided a computing system, comprising: one or more memory modules; one or more processors; a graphical user interface; and a customer journey mapping tool stored on one or more of the memory modules, the customer journey mapping tool operable when executed by the one or more processors to perform the aforementioned method.

According to an aspect of the invention, there is provided a computer program comprising code instructions for implementing the aforementioned method.

According to an aspect of the invention, there is provided a computer program product comprising a computer readable storage medium having computer-readable program code embodied thereon, the computer readable program code configured to carry out the aforementioned method.

BRIEF DESCRIPTION OF THE DRAWINGS

To describe the manner in which the above recited features of the invention are obtained, embodiments of the invention will now be described with reference to the appended figures. It is understood that these figures only depict typical embodiments of the invention and are not in any way meant to limit the scope thereof. Therefore, embodiments will be described in detail through the accompanying figures in which.

DETAILED DESCRIPTION OF THE EMBODIMENTS

Embodiments of this invention provide a new method, a new system, a computer program product and program for creating a journey map comprising one or more journey steps, for monitoring an activity of a user and for associating the monitored activity to the one or more journey steps.

Throughout this specification, the user can interact with an organisation using a media or a channel. The user interacting with the organisation through various channels may be an individual customer or a person acting on behalf of an organisation or a member of an organisation. Hence embodiments of this invention include interactions between an organisation and a user (e.g business to consumer scenarios (B2C)) and interactions between organisations (e.g business to business scenarios (B2B)). The places where a user on a journey interacts with an organisation are called "touch-points". In these places, the activities or actions performed by the user can cause the user to move along the journey.

In embodiments of the invention, a journey map representative of a customer/user journey comprising at least a journey step is created and configured. A journey is made actionable by associating listeners to journey steps. To that end, there is provided a method of associating a user interaction over a touch-point to a defined journey step. The journey map step the user interaction is associated to may have been predefined.

Figure 1:
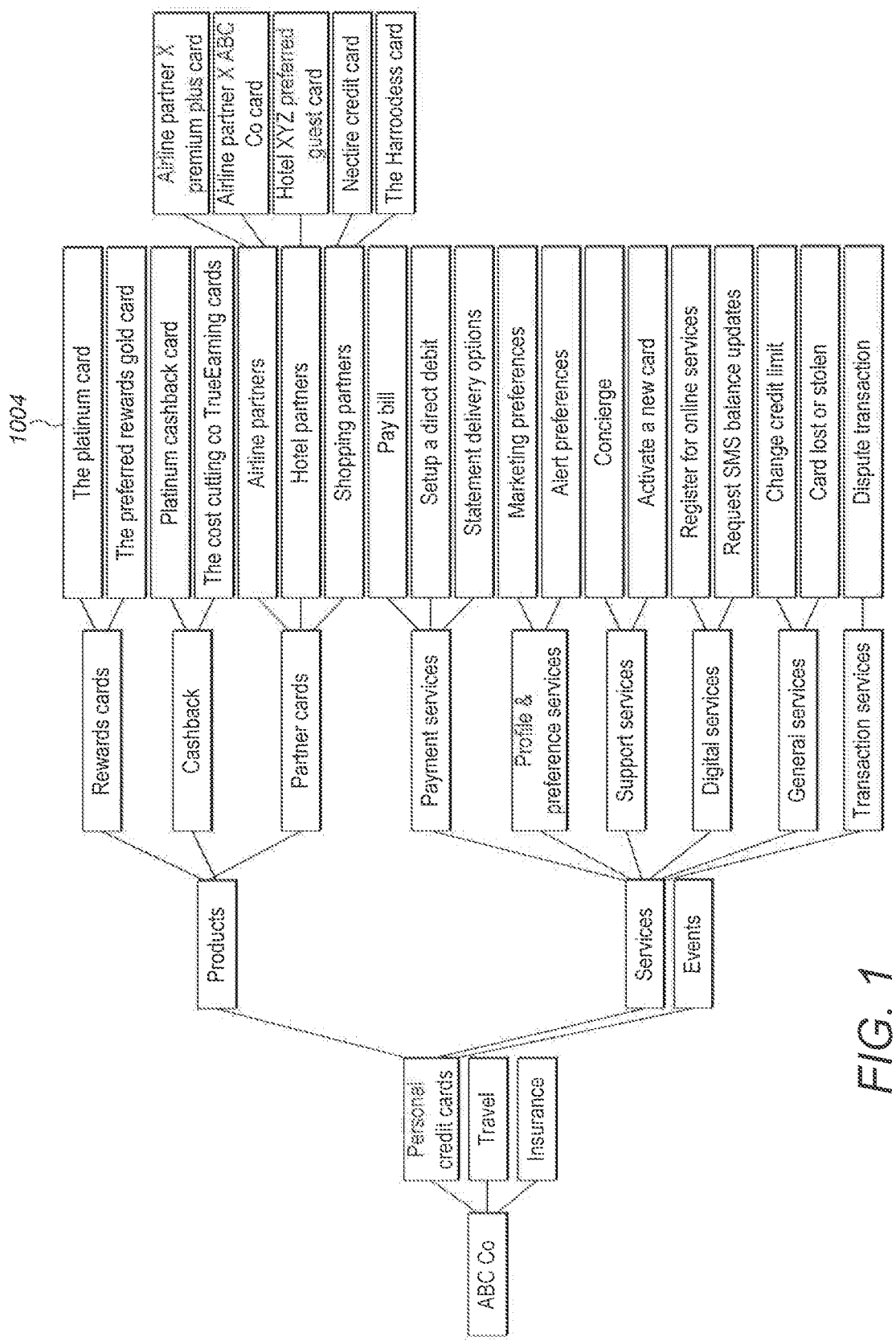
FIG. 1 schematically depicts a list of product and services associated with an organisation.
Figure 2:
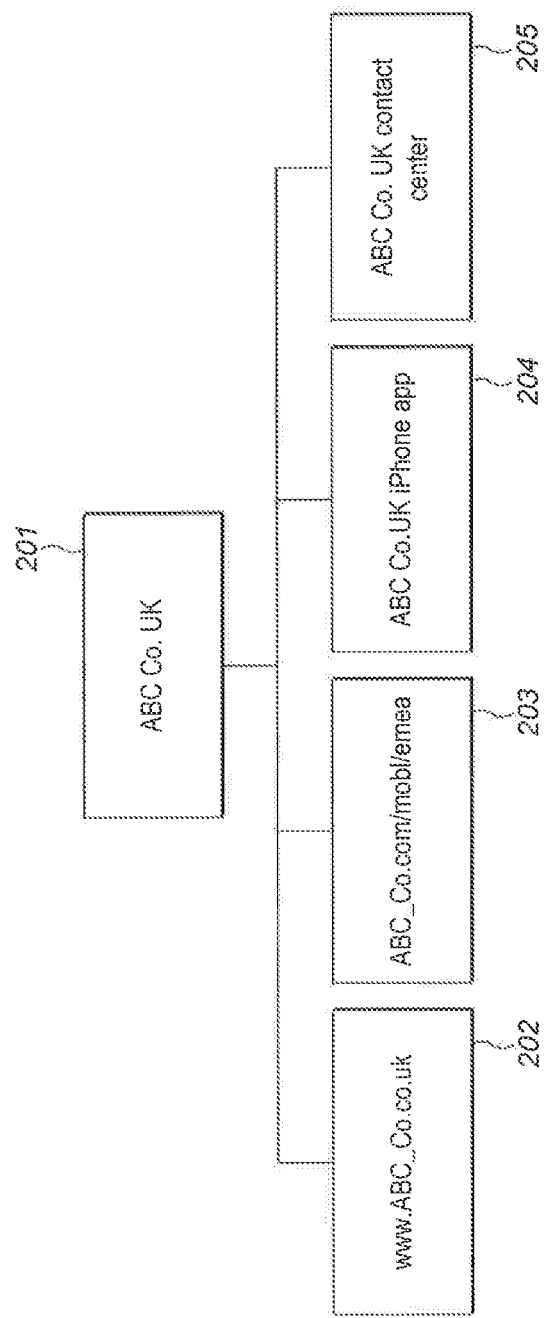
FIG. 2 schematically depicts a touch-point map associated with an organisation.
Figure 3:
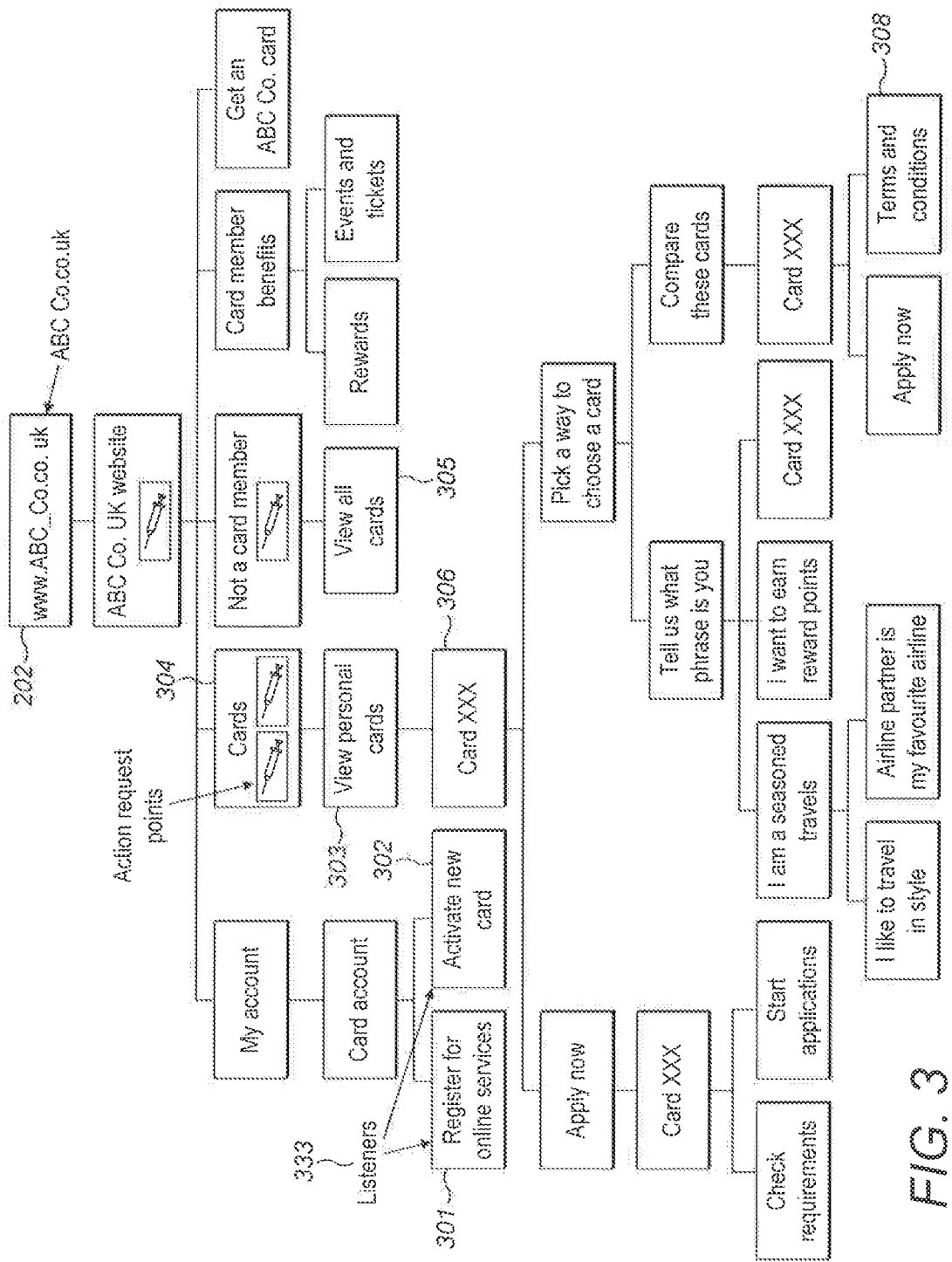
FIGS. 3-6 schematically depict touch-points on various channels.
Figure 4:
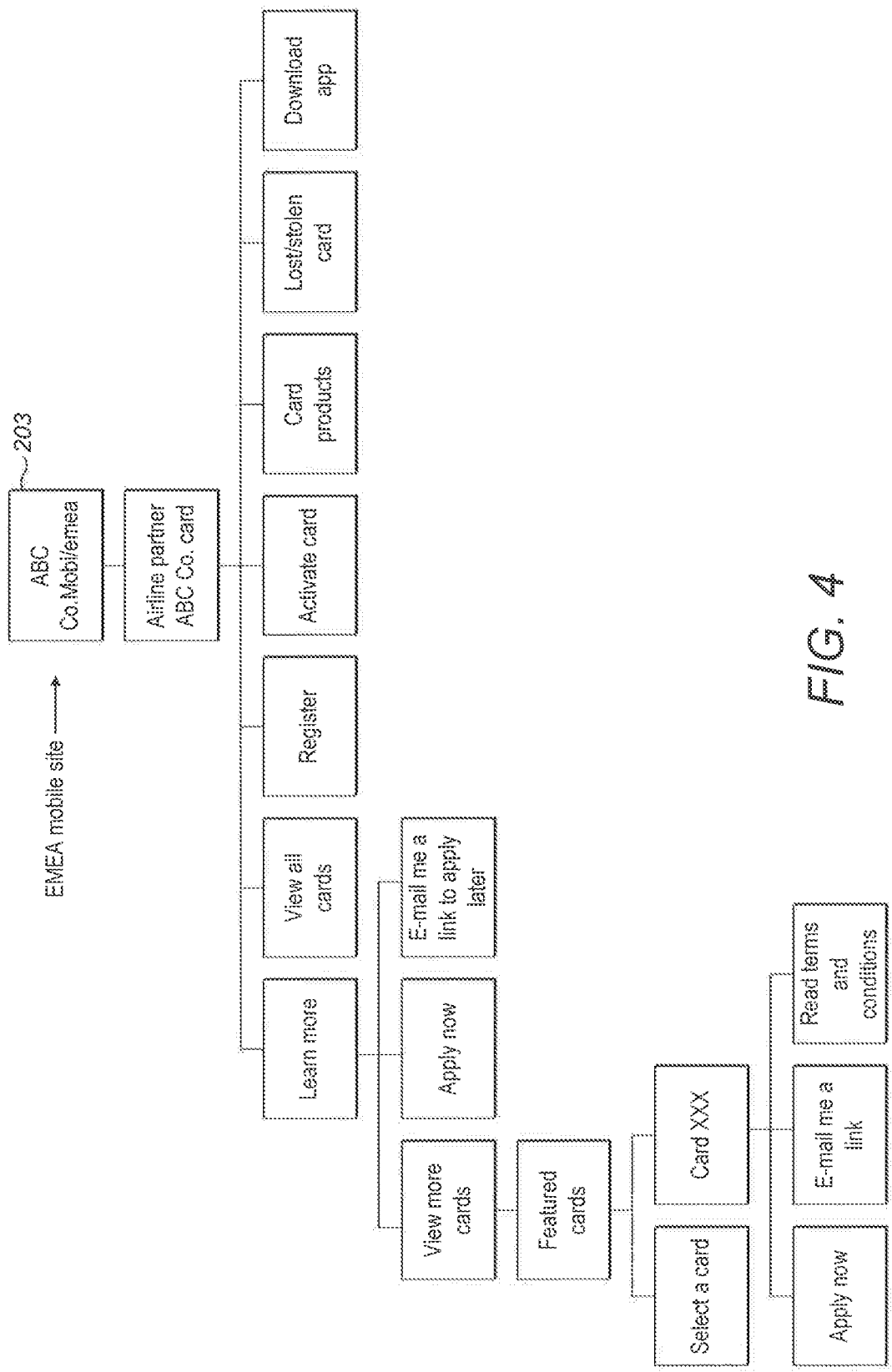
Figure 5:
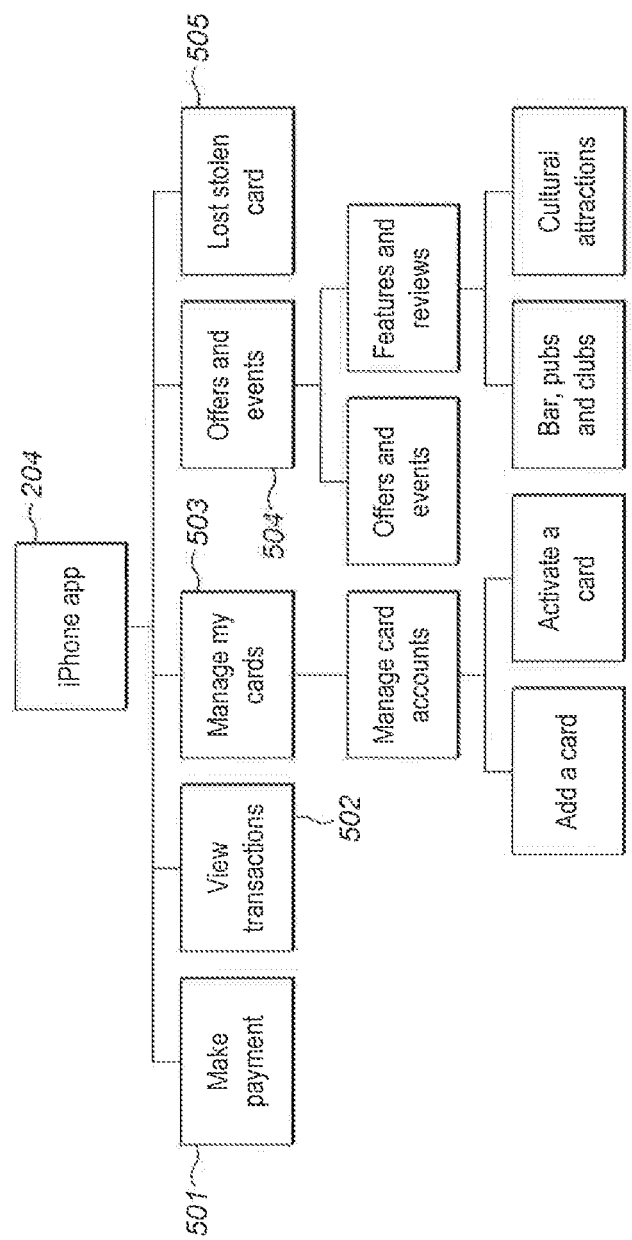
Figure 6:
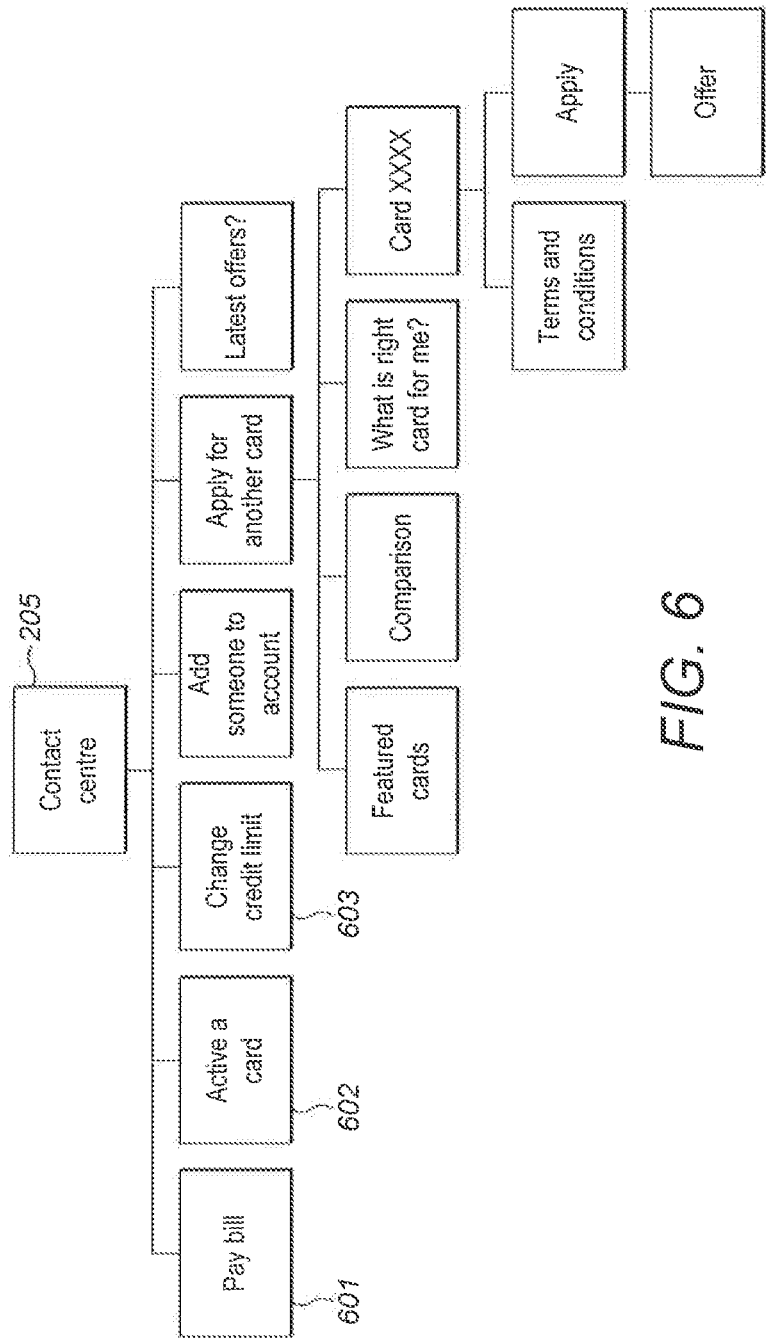

FIG. 2 represents an exemplary map of several touch-points where users can interact with an organisation and, in this example, the organisation is a credit card company referred to as "ABC Co. UK" 201 organisation. These places of interactions include a web site www.ABC_Co.co.uk 202 which the user can visit to interact with "ABC Co U.K". The set of touch-points also includes an ABC Co Mobile EMEA site 203, an ABC Co UK iPhone® Application 204, and a contact center 205 through which the user may access and interact with the ABC Co organisation in the U.K. FIGS. 3-6 represent exemplary maps of actions that a user may carry on the respective touch-points 202, 203, 204, 205 to interact with the ABC Co organisation in the U.K. For instance, FIG. 3 shows that a user interacting with ABC Co via the www.ABC_Co.co.uk site 202, may perform or request several actions including "Register for Online Services" 301 or "Activate new Card" 302. FIG. 5 exemplary shows that a user interacting with the ABC Co organisation via the iPhone Application 204 may request a payment using the iPhone 501, view transactions 502 or manage his cards 503. In FIG. 6, there is described a set of actions that a user may carry out when he calls a call center 205. These actions include, for example, paying a bill 601 or Activate a Card 602 etc.

Throughout this description, these actions are also called user's activities or behaviours. Examples of user actions include for instance a cross-channel switching behaviour, which is characterised by the user switching communication channel. For instance, a user accesses a mobile web site of his bank using his mobile phone and then later makes a phone call to a call centre of his bank. This activity corresponds to a cross-channel switching behaviour because the user has switched from the mobile web channel to the voice communication channel. This activity may correspond to a move along his journey.

Any actions that may cause an interaction with an organisation can be monitored on respective touch-points by means of listeners. FIG. 3 for instance shows that listeners 333 have been provided at the touch-points "register to online Services" 301, and "Activate new card" 302. Accordingly, these listeners 333 monitor the actions 301, 302 carried out by a user interacting with ABC Co via the web site www.ABC_Co.co.uk. A listener is typically an application capable of capturing information relating to a user's interactions on a channel. There may be listeners across a plurality of media and/or channels. The listeners 333 can be provided at one or more of the touch-points.

Figure 7:
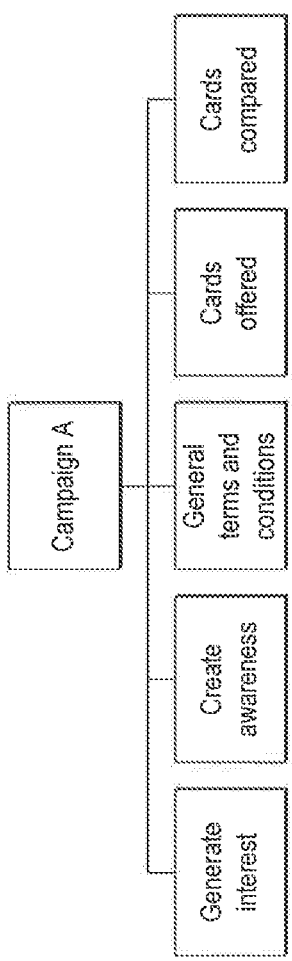
FIG. 7 schematically depicts an example touch-point map.

FIG. 7 represents one example of a Marketing campaign structure ("Campaign A") and each communication as part of a campaign can be "pushed" to one as a "listener" and specific "listeners" would show how a customer progresses along a journey as he is enticed to do so via the campaign.

Figure 8:
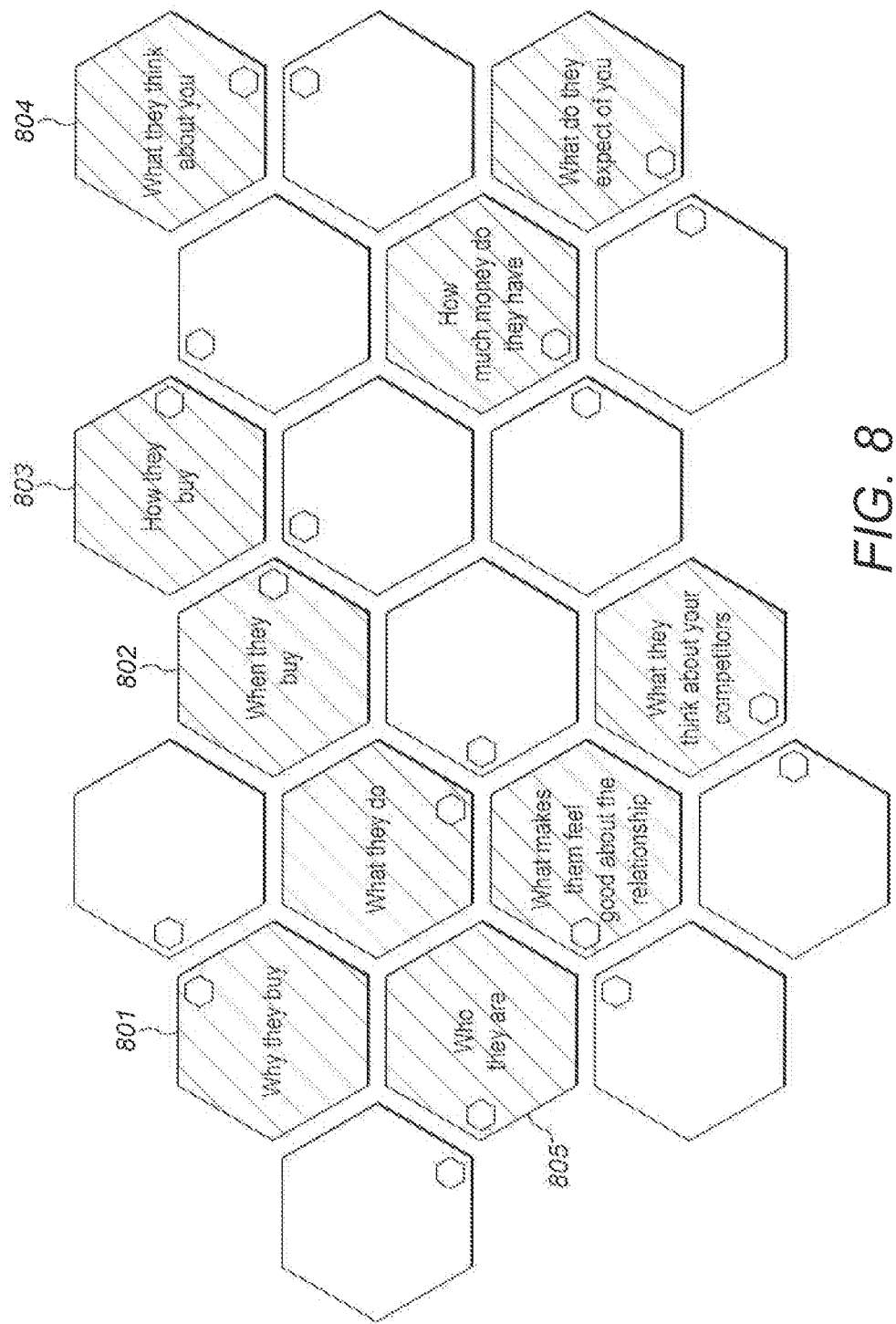
FIG. 8 schematically depicts an exemplary Adaptive Engagement Profile.

FIG. 8 illustrates an "Adaptive Engagement Profile" or AEP. An AEP is a user profile containing attributes. These attributes may describe personal information such as the user's habits, behaviours, motivations, opinions, likes, dislikes etc. The AEP profile may also comprise information relating to the services the user has been accessing. It may also contain geographical information relating to the user's past and current geographical positioning. Such information is available to an organisation authorized to collect various information relating to the user. The AEP is a dynamic profile because the contents of the AEP may change with time. The information obtained from the listeners may be stored as part of the information in the AEP. FIG. 8 graphically represents an AEP comprising various attributes describing for example the motives of a user ("why they buy) 801, or information on "When" and "How" the customer/user buys 802, 803. It also exemplary comprises information on what the user thinks about an organisation ("what they think about you" 804) and other various attributes. The motivation to collect this information is to augment the organisation's understanding of the user's behaviour and intentions as the user travels along a customer journey.

The customer's journey can be defined in several steps. This sequence of steps can be broken down into sub-steps. Each interaction between a user (e.g a potential customer) and the business/organisation may be considered to be at a step of the customer journey. In one embodiment, the steps of a typical customer's journey include "awareness", "consideration", "enquiry", "purchase" and "retention". As the user interacts with an organisation, he may move across different steps along the journey. For instance, a customer typically moves from the step of "awareness" representing the customer awareness of a product to finally reach the step of "purchase" of the product.

Figure 9:
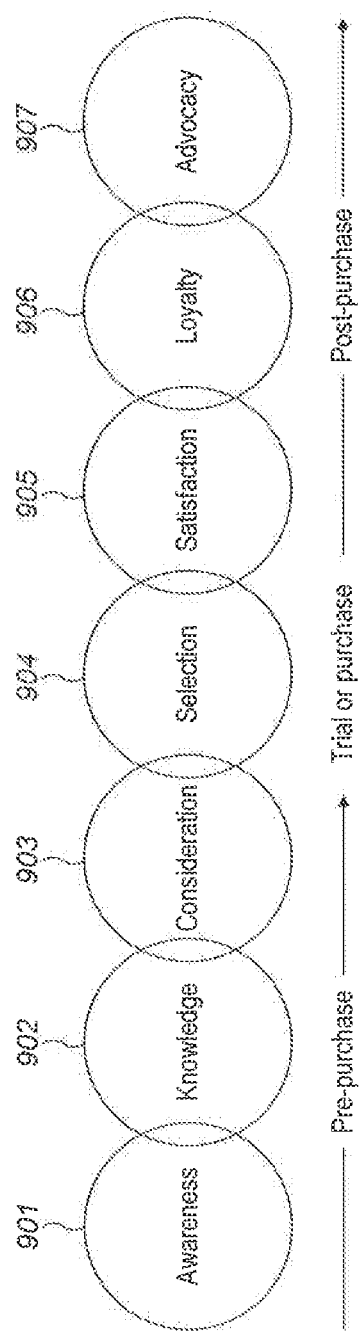
FIG. 9 schematically depicts a journey lifecycle.
Figure 10:
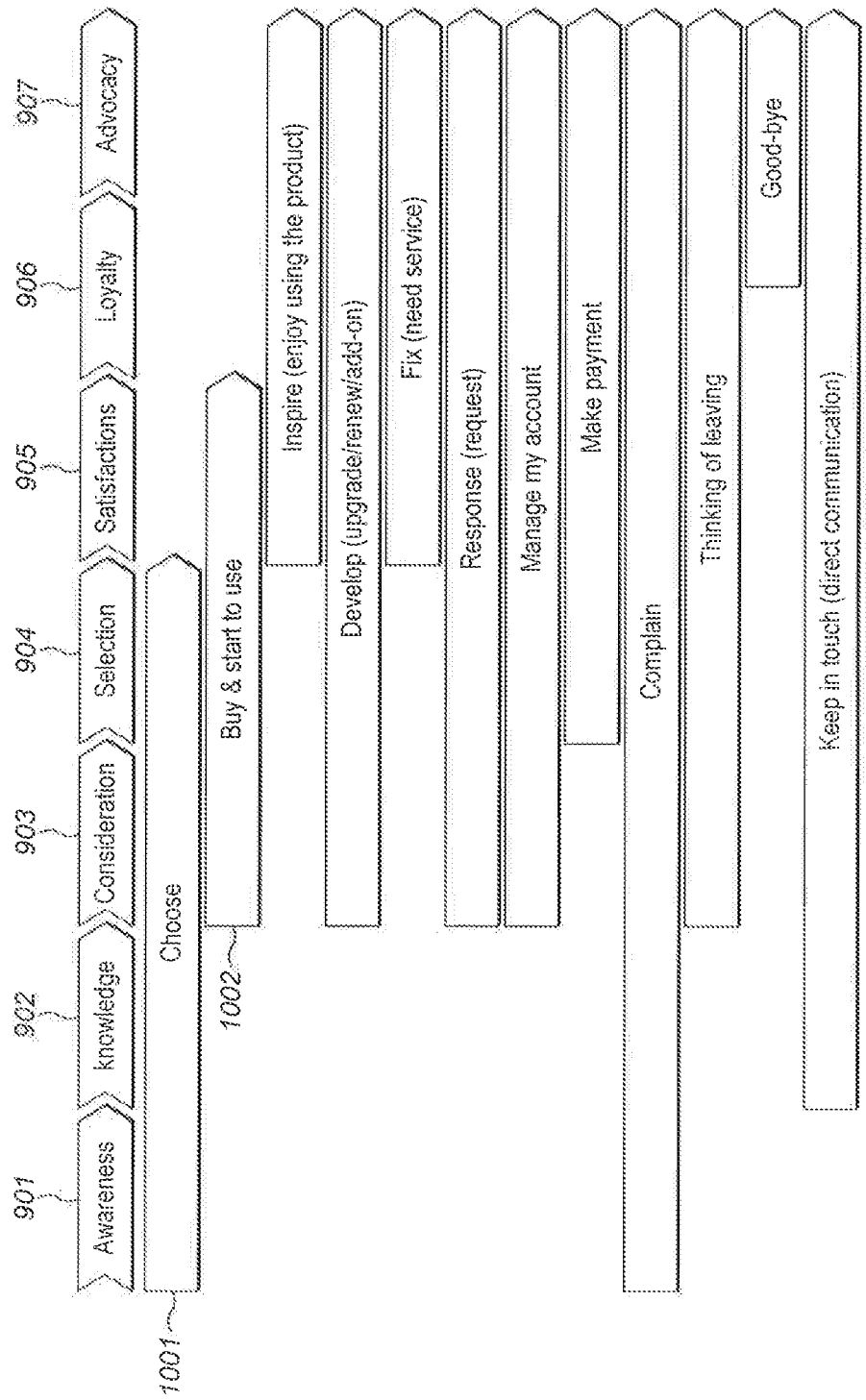
FIGS. 10-13 schematically depict examples of journey maps.
Figure 11:
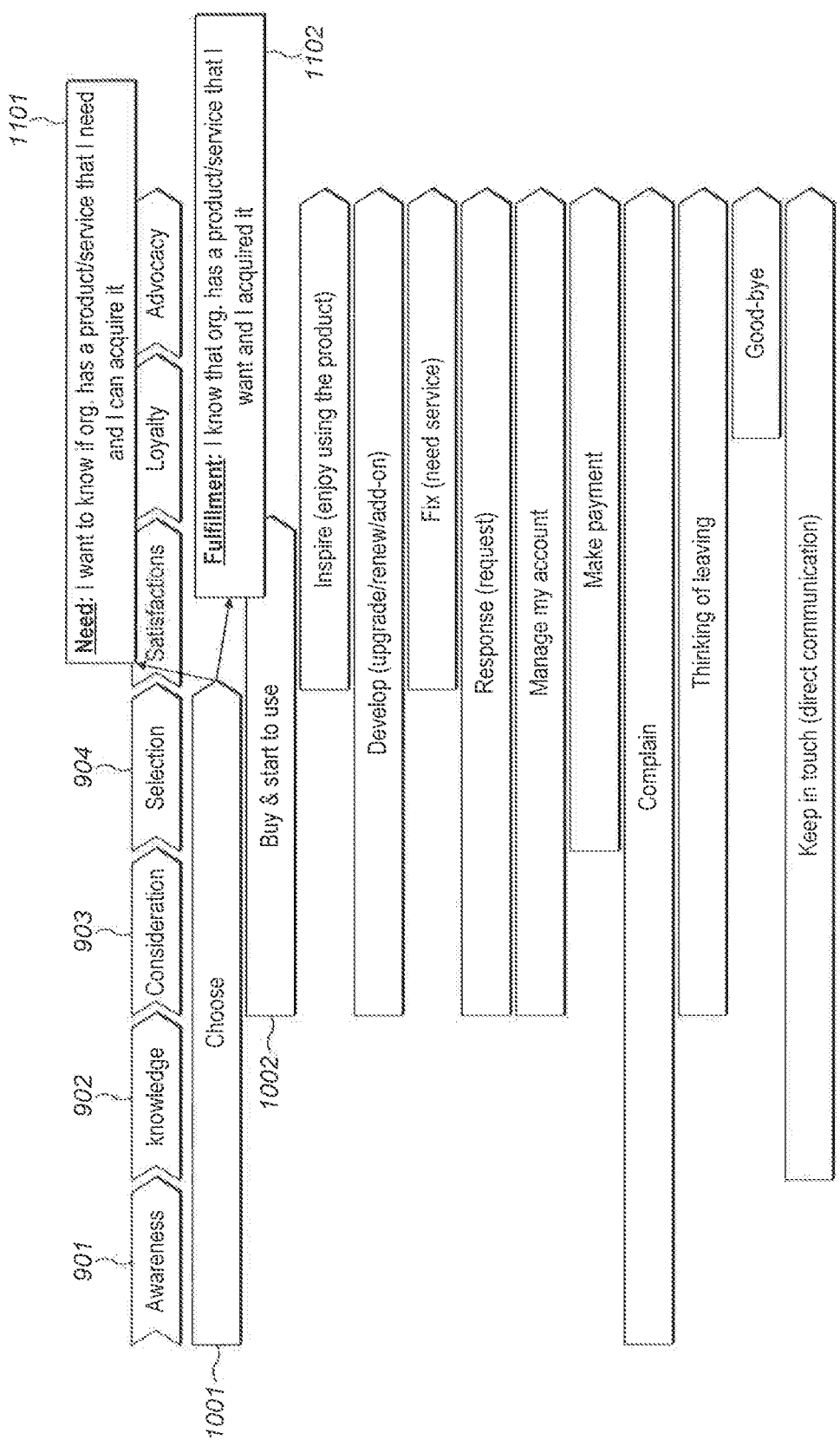
Figure 12:
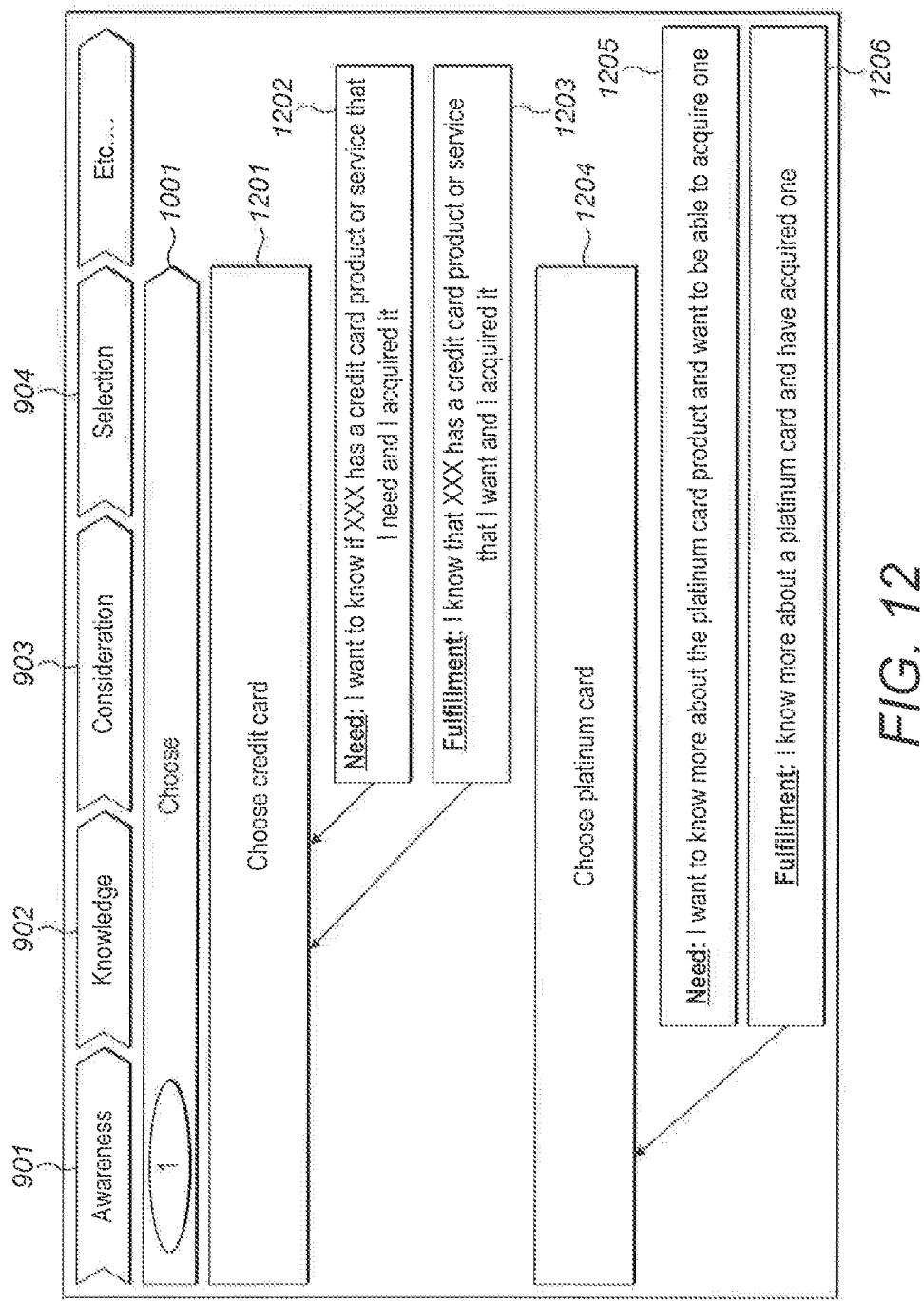

FIG. 9 for example shows three major phases in a customer's journey lifecycle. The first phase shown is the Pre-purchase phase which comprises the steps of customer's "Awareness" 901, the step of "Knowledge" 902 and the step of "Consideration 903". Typically, in the step of "Awareness", the customer is being made aware of a product or service. In the step of "Knowledge 902" the customer typically acquires knowledge regarding one or a plurality of products and/or services before considering a purchase. The trial or purchase phase comprises the "Selection" 904 and "Satisfaction" 905 steps. In the step of "Selection" the customer typically makes a selection in view of the information he has acquired in the previous steps of the Pre-purchase phase. Finally FIG. 9 shows the Post-purchase phase comprising the "Loyalty" 906 and "Advocacy" 907 steps, which are usually entered by satisfied customers. Each customer journey can be represented on a journey map. A journey map can represent different steps of the journey together with predefined actions. For instance, FIG. 10 represents different customer's predefined actions such as "Choose" 1001, "Buy & Start to Use" (1002) etc. Each predefined action may overlap a number of journey phases. For instance, in FIGS. 10 and 11, the predefined activity of choosing a service or product "Choose" 1001 can occur over the four journey steps of "Awareness" 901, "Knowledge" 902, "Consideration" 903 and "Selection" 904. FIG. 11 further indicates in label 1101 the expression of the need of a user/customer. The expression of this need occurs as part of the action "Choose" 1101 where the customer/user wonders for example if a certain web site offers the product/service that he needs to acquire. Label 1102 additionally shows as part of the action "Choose" 1001 that the customer need is finally fulfilled. Thanks to his awareness and knowledge of the product/service (steps 901-902), the customer considered (step 903) and finally completed the purchase step 904. FIG. 12 illustrates a similar customer journey where the action of choosing applies to a credit card 1201. Once the need fir acquiring a credit card is fulfilled (1202-1203), the steps of "Awareness" to "Selection" (901-904) comprise the further action of choosing the "Platinum Card" product 1204.

Figure 13:
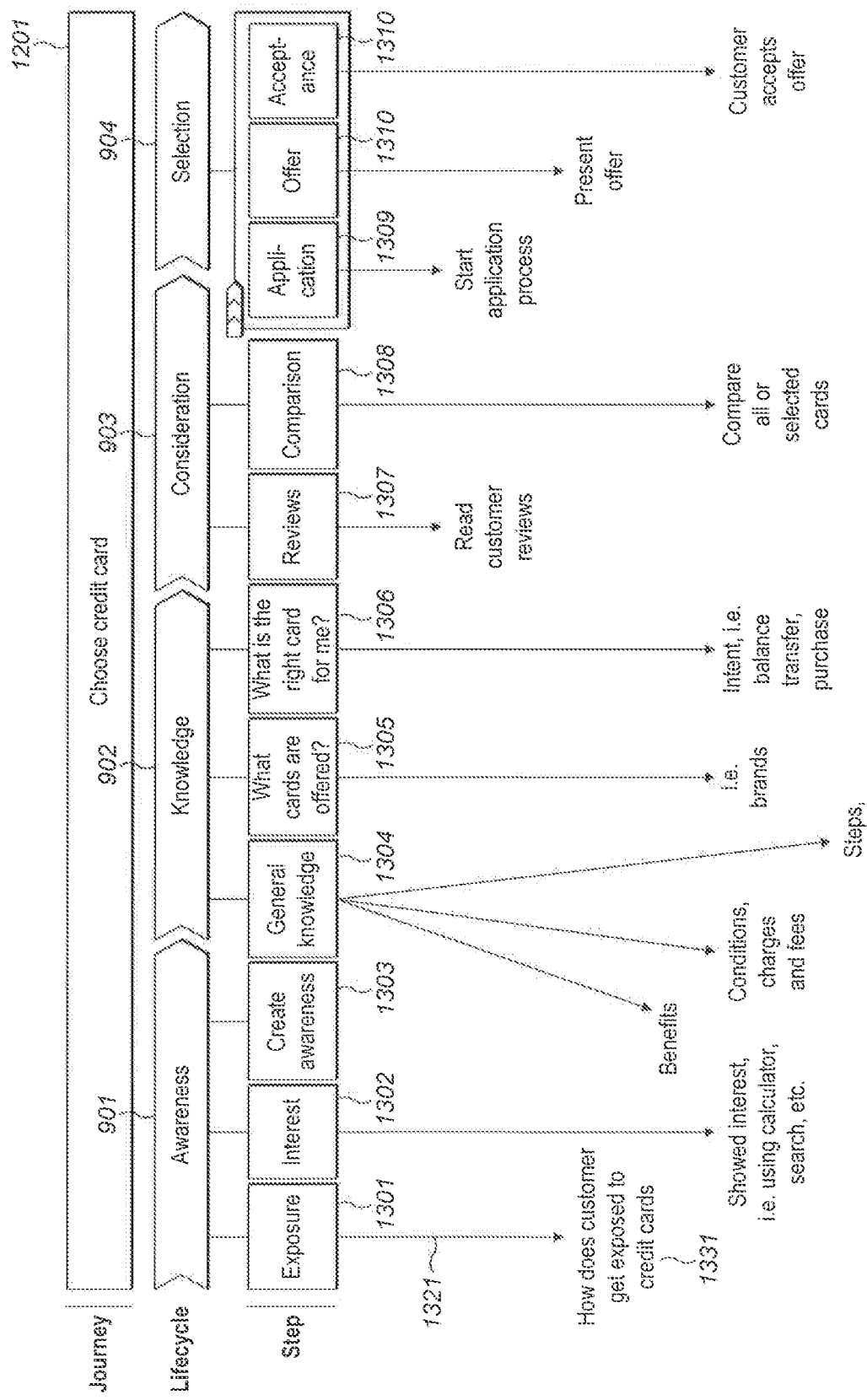

The predefined lifecycle steps can be further subdivided into sub-steps. Hence FIG. 13 shows for example the sub-steps of "Exposure" 1301 "Interest" 1302 and "Create Awareness" 1303 as being subdivisions of the "Awareness" step 901. Subdividing a journey lifecycle into sub-steps is used in journey maps to identify with finer granularity a part of a journey step a customer may be in. FIG. 13 further shows a mapping between sub-steps and descriptions of possible user intentions. For instance the arrow 1321 indicates that the sub-step "Exposure" 1301 corresponds to a questioning on "how does the customer get exposed to credit cards" 1331.

Figure 14:
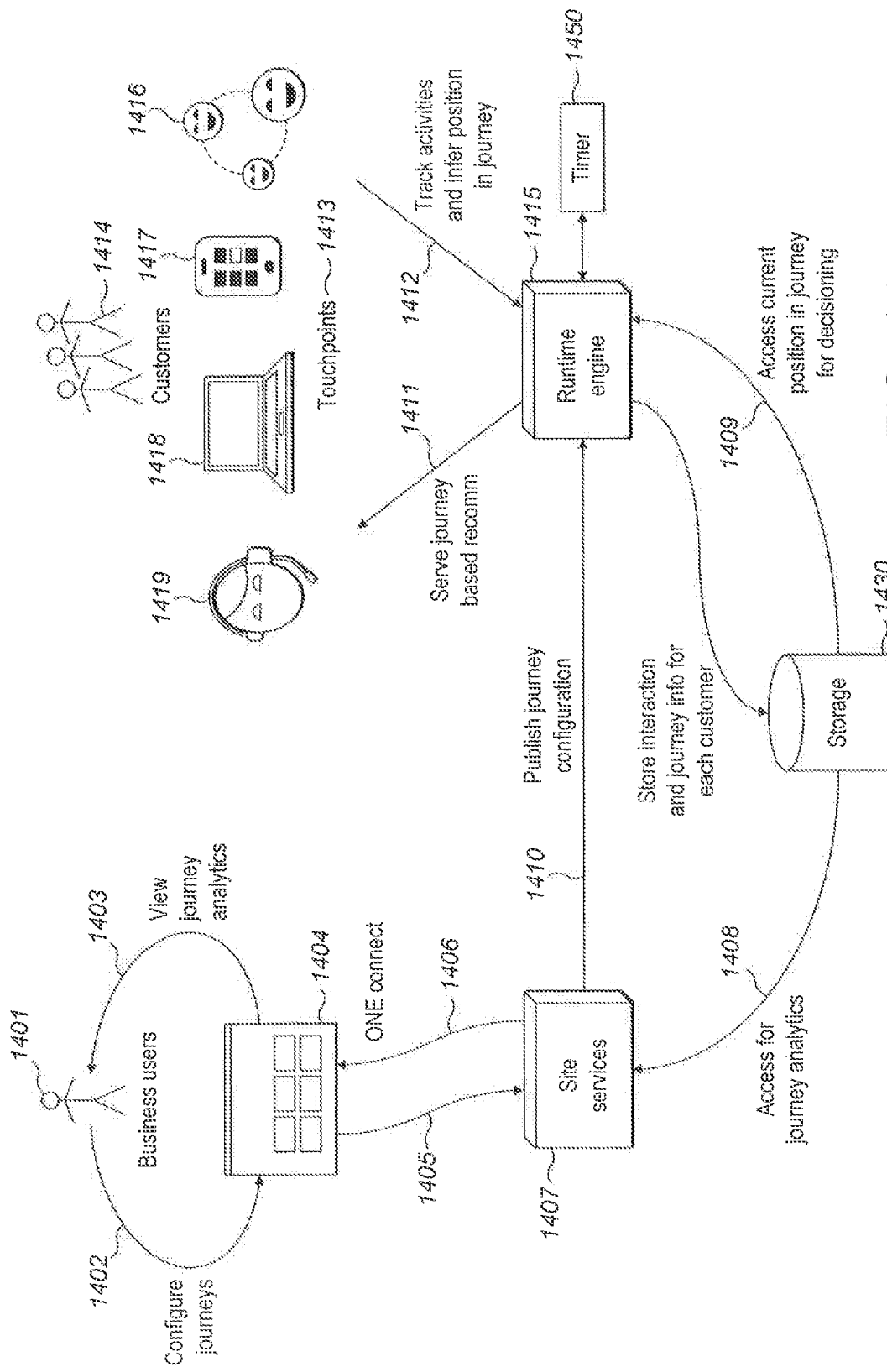
FIG. 14 schematically depicts components of a system according to an embodiment of the invention.

Now referring to the flow diagram and system components of FIG. 14, embodiments of the invention are described.

A step relating to creation and/or configuration of a journey is shown in FIG. 14 by arrow 1402. The journey map can be created manually via a graphical user interface by a user who can be a business user 1401. The graphical user interface may be provided on a computer program running locally on a computer or on a network (not shown on FIG. 14). Once created and configured, the customer journey map 1404 may be accessible by authorised users 1401. A journey map can be created for a single user or for a group of users. Moreover a plurality of journey maps may be created for a specific group of users, each journey map having a particular sequence of steps. Usually a journey map is associated with a product or service.

Customers 1414 are users who may interact with organisations through various media or channels including social media 1416, mobile applications 1417, computer networks 1418, voice communications such as voice over IP telephony 1419 etc.

Listeners can be created in many ways including:
- Web tagger via a web page plug-in such as Chrome™ plug-in: It allows a user to define which areas of a page (or a page as a whole) represents information that should be captured by the listener;
- Software Development Kit (SDK) plug-in for Native Mobile applications: This is where an operating system (e.g iOS) or Android Native mobile application is compiled. This allows a business user to define which areas of a Native Mobile application represent "listeners" when that application is compiled with the SDK plug-in;
- Out of the box Adapters: A customer adapter is built for a solution such as customer relationship management software, Salesforce®, where there is a set of screens which allows a business user to define which events represent "listeners"; or
- Application Program Interface (API's): It is provided by a Restful Web Services API which allows companies to create "listeners" from any source system, i.e. Paypal®. So a payment in Paypal® could trigger a listening activity.

A listener is stored in a database as an "Activity" and has the following attributes "Proposition", "Touchpoint", "Lifecycle Stage", "Journey Type", "Activity Type", etc.

As indicated above, listeners installed on various touchpoints 1413 monitor the user's activities. When a listener is activated, it tracks the activities of the customers. The listener can be activated by starting a monitoring application running on a computer. Starting a monitoring activity can be achieved via a graphical user interface by clicking on a link pointing to the monitoring software. The monitoring activity can be a website of an organisation, for example. The listener provides information relating to the user's activity and the information can be used for associating the user monitored activity to the pre-configured journey step. The information characterising the customer's action can be incorporated into the Adaptive Engagement Profile or AEP (not shown on FIG. 14). The information present in the AEP (e.g customer's preferences, likes, dislikes etc) can in turn be used to drive or to direct the customer along his journey. The contents of the AEP can be calculated and updated as the user progresses through his journey. The AEP contents or attributes at each step or stage of the user journey can then be consulted to reach a decision on how to progress the user along the remaining portion of his journey. It is noted that the AEP contents can be calculated using degradation algorithms. The progress of a user throughout his journey across multiple touch-points can be used to acquire information about the user's cross channel switching behaviours. For instance the history of the user monitored activities may indicate that he frequently switches between a web channel to another channel where he can find assistance (e.g call support center). The history of the user's activities can then be used to determine how to influence the customer's progression along the journey.

The association of the user monitored activity to the journey step can be executed by inferring from a given tracked activity that the customer is in a particular position of the journey. Checking if a user's activity can be associated with a journey step can be achieved by comparing the attributes of the customer's activity and the attributes of the configured journey step. Such verification can be computed by means of a computer program. For instance, with reference to FIG. 12, if a customer is on a "Choose Credit Card" 1201 journey while visiting the ABC Co web site, the selection of a platinum card product 1204, may lead to a determination that the customer is currently in the position "Selection" 904 of the journey. An organisation may arbitrarily define the user's behaviours that it wishes monitored by positioning listeners (333) at the appropriate points in the journey. It would also have the freedom to define arbitrary customer journey steps.

In an embodiment of the invention, when the customer's monitored activity can be associated with a configured journey step, a mapping or an association is created between the user's activity and the journey step. The manner in which an association is checked and a mapping is created is left to implementation preferences. A program performing these checks may run on Runtime Engine 1415 which can be a network entity capable of executing computer operations. Note that the Runtime Engine 1415 of FIG. 14 may have previously received a copy of the customer's pre-configured journey map from a site 1407. The site 1407 is typically connected to a platform containing the available configured journey map 1404. A copy of the customer journey map may be published or transmitted by means of secure transport and/or application protocols (arrow 1410 of FIG. 14) from the site 1407.

Figure 15:
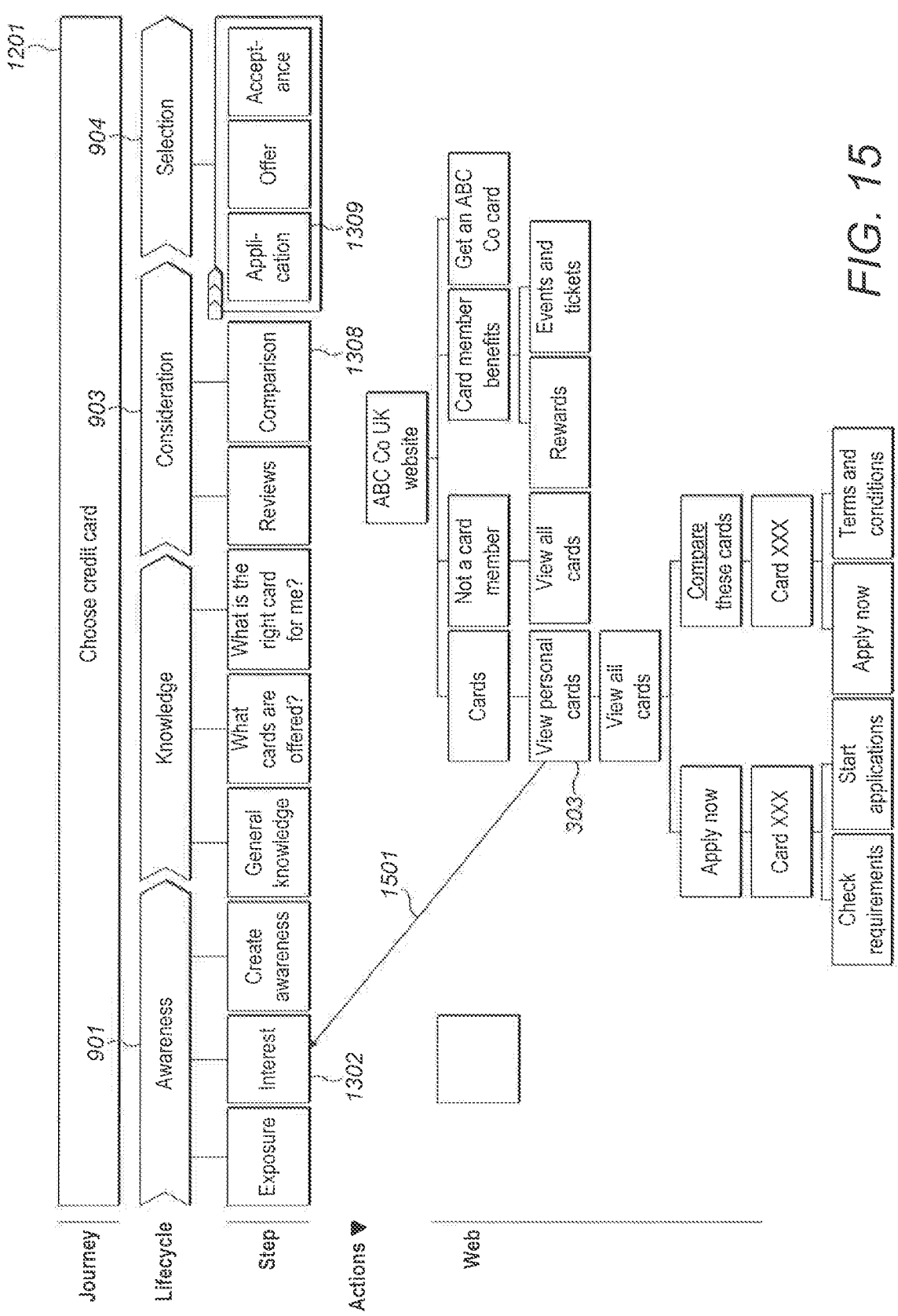
FIG. 15 depicts a mapping between a user's activity on a web site and a journey step.

The mapping can equally be associated between a customer's monitored activity and a sub-step of a journey. FIGS. 15, 16, 18, 20, 22, 24 graphically represent examples of such mappings. FIG. 15 shows a single mapping, in the form of an arrow 1501, between the user's monitored activity of viewing "Personal Cards" 303 and the journey step "interest" 1302. Note that the step 1302 is configured as a sub-step of the step "Awareness" 901 in the exemplary customer journey "Choose Credit Card" of FIGS. 13, 15. As indicated above, breaking a journey step or a phase into smaller sub-steps advantageously provides finer definition of the sub-step. Mapping a user activity to a step and particularly mapping the activity to a more finely defined sub-step provides a better understanding of user's behaviours and identification of problems that may exist in stages of the journey. Such understanding may help an organisation to take appropriate decisions and design optimisations to help the customer move along the journey in a particular way. For instance if a user or group of users routinely drop-off or leave a journey without completing the journey, at the sub-step "comparison" 1308 of the "Choose Credit Card" 1201 journey, it may indicate a lack of comparison information available to the would be customers. Accordingly an organisation may decide to provide sufficient information to the users reaching this sub-step to drive them out of the "consideration" 903 sub-step into a "selection" 904 or purchase stage.

Providing mapping of user activity to the journey map steps and particularly providing mapping of user activity with smaller sub-steps can also improve identification of technical problems. For instance if several customers keep dropping off the "choose credit card" 1201 journey at the sub-step "Application" 1309 without progressing further to a phase of purchase, it may indicate a problem on the web site at the application phase. The association of user's behaviours with finely defined sub-steps may facilitate problem identification and therefore ease problem solving.

Figure 16:
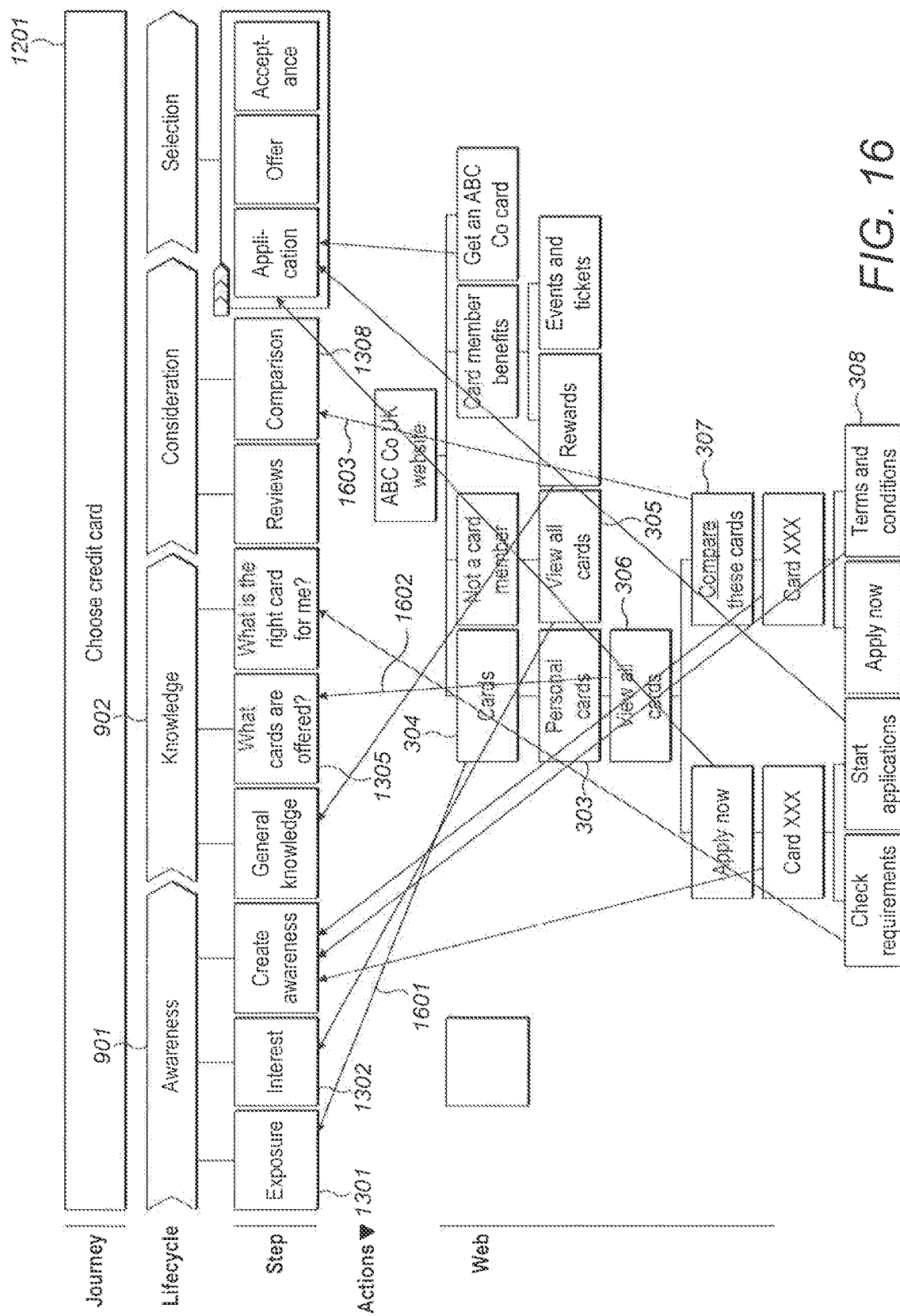
FIG. 16 depicts a plurality of mappings between a user's activities and journey steps.
Figure 17:
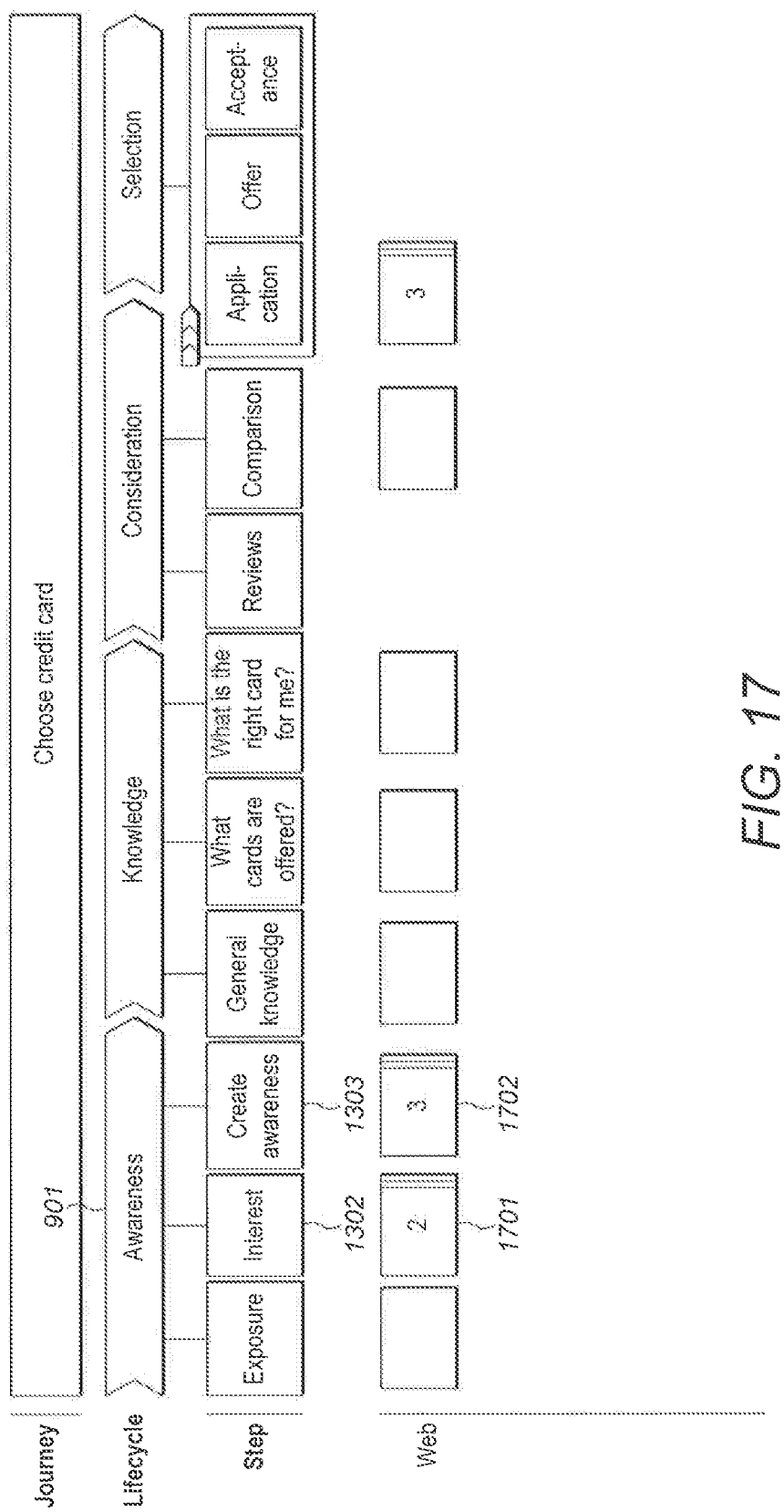
FIG. 17 depicts the number of interactions in a web channel.
Figure 18:
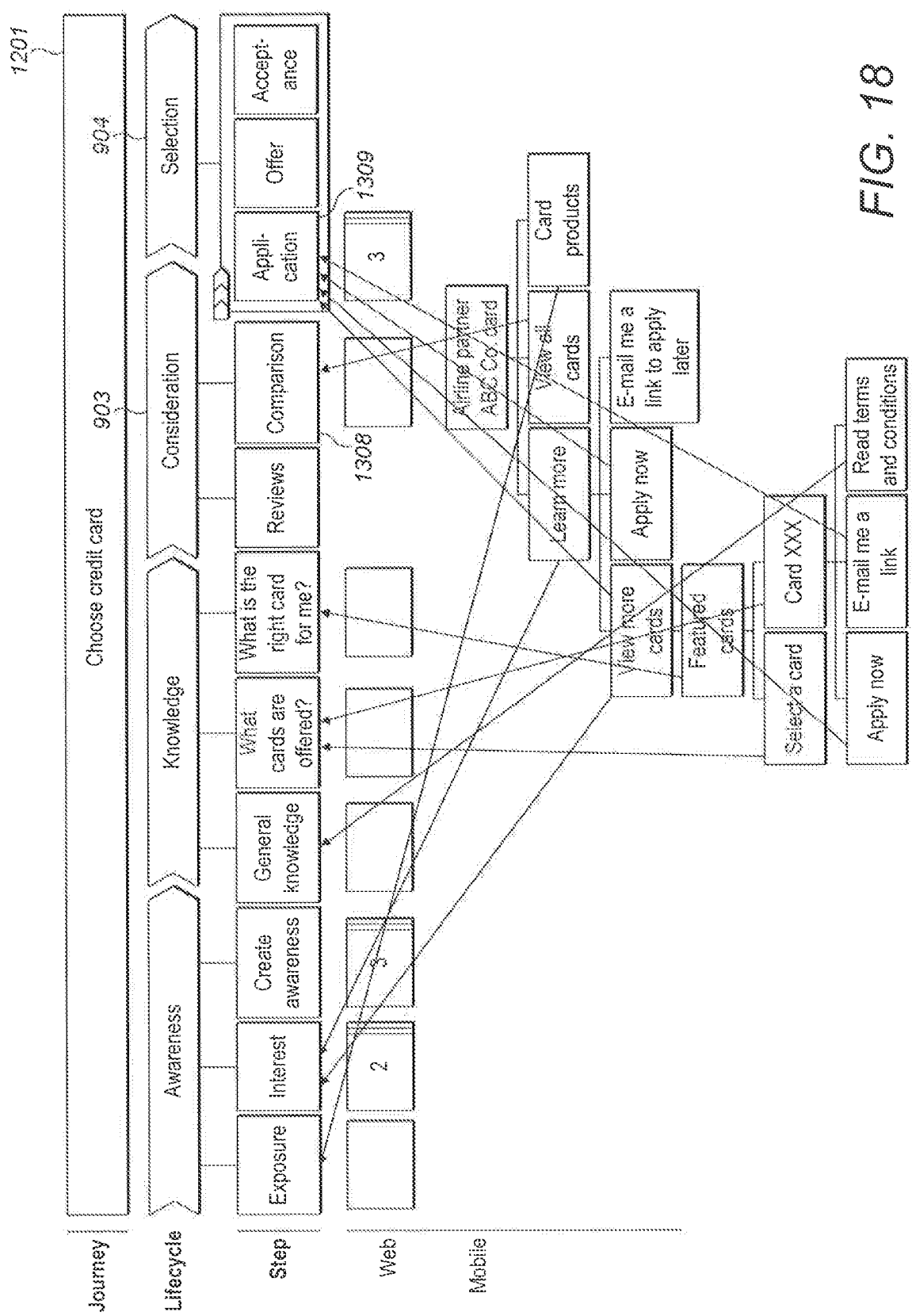
FIG. 18 depicts a plurality of mappings between a user's activities on a web site and journey steps.
Figure 19:
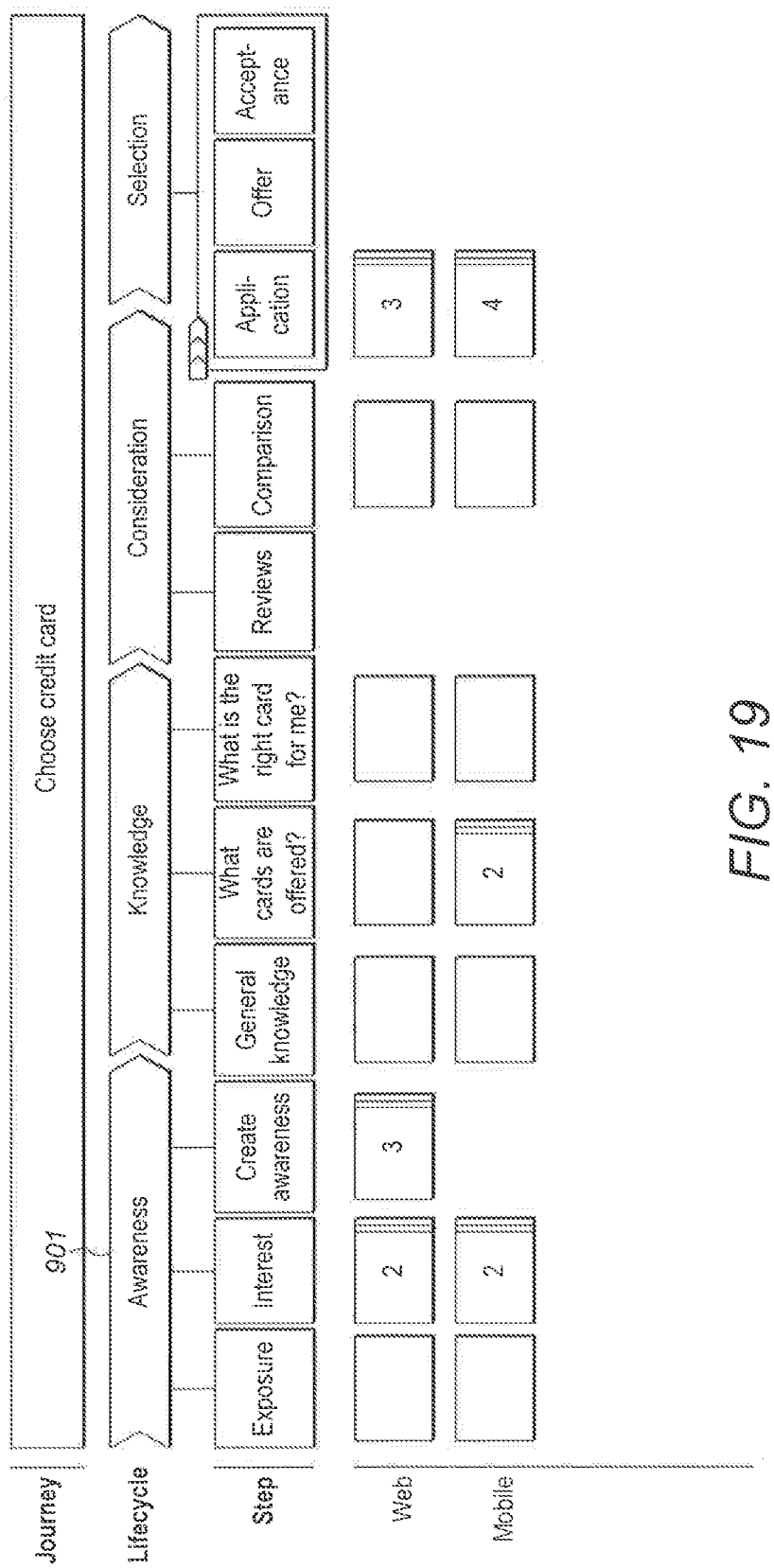
FIG. 19 depicts the number of user interactions in a web and a mobile channel.
Figure 20:
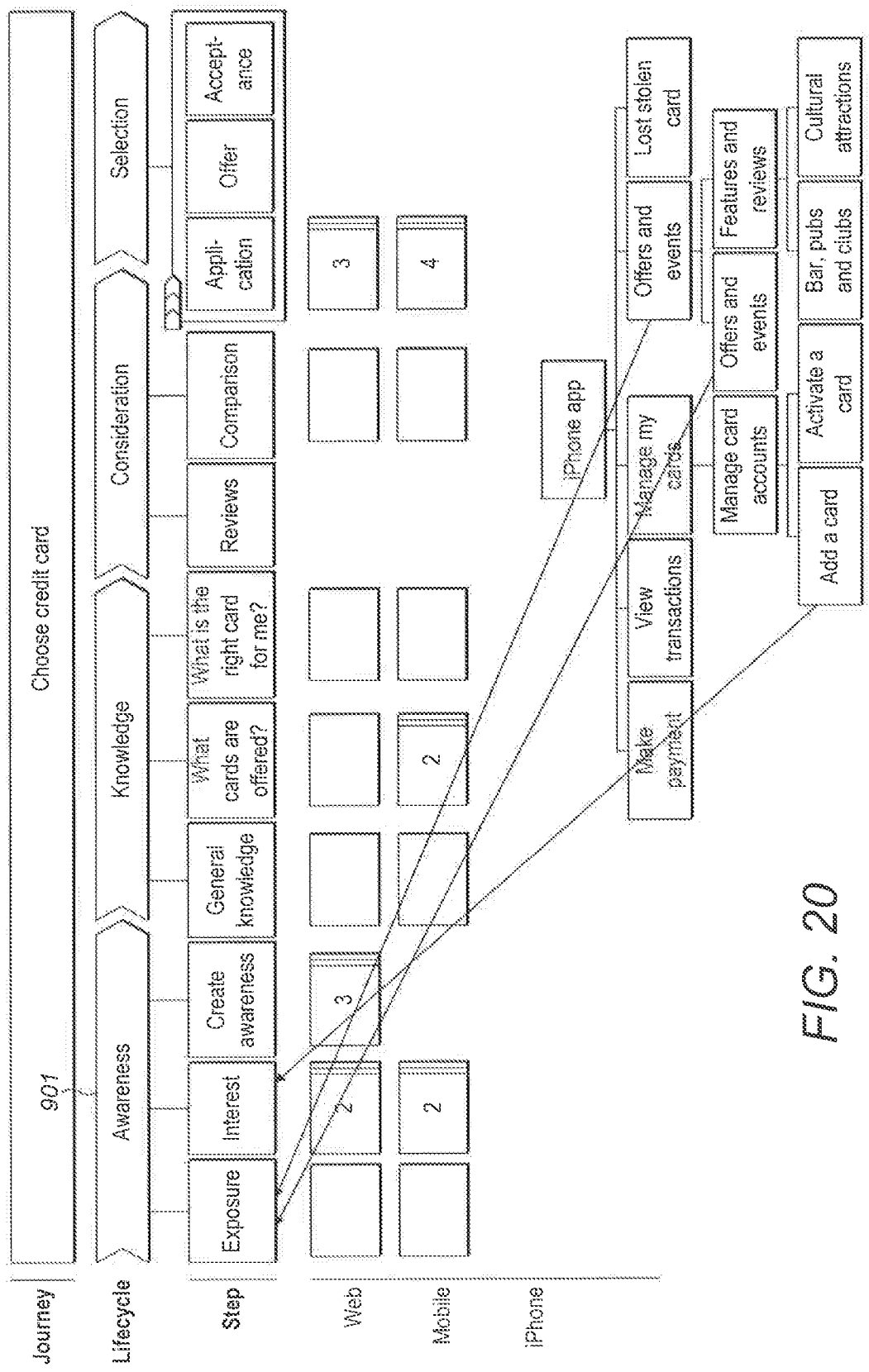
FIG. 20 depicts a plurality of mappings between a user's activities on a bank site and journey steps.
Figure 21:
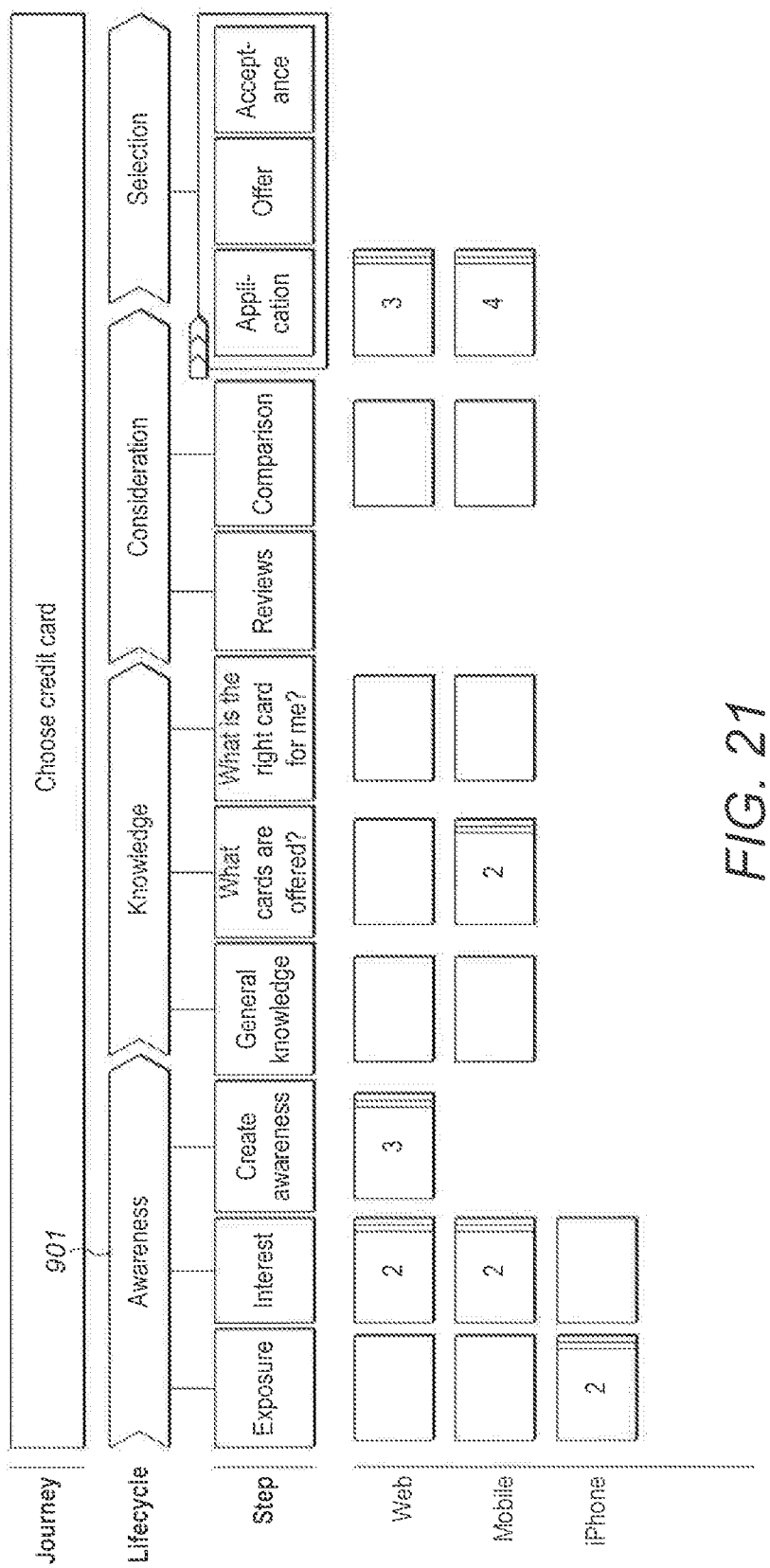
FIG. 21 depicts the number of user interactions in web, mobile and iPhone® channels.
Figure 22:
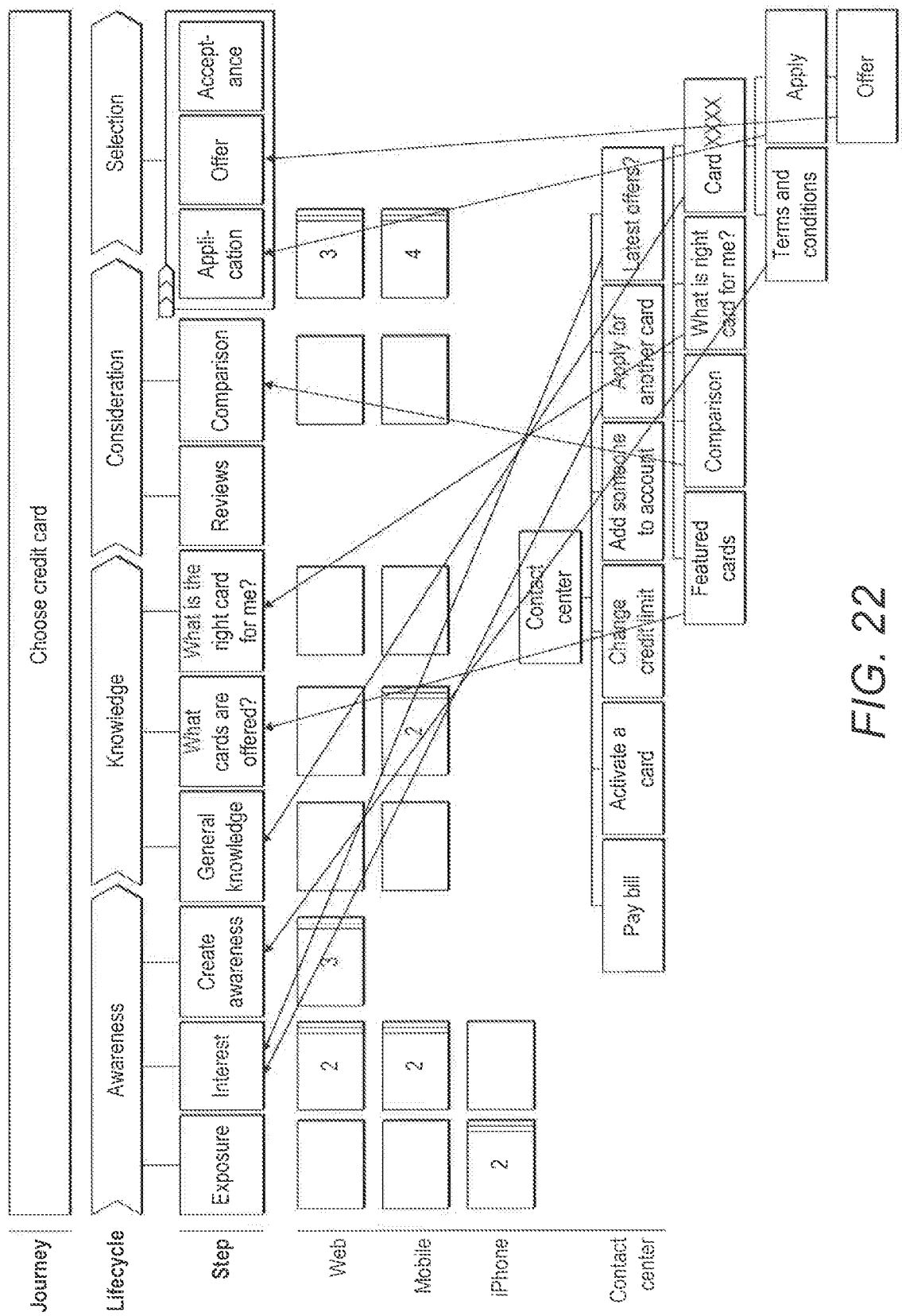
FIG. 22 depicts a plurality of mappings between a user's activities calling a call center and journey steps.
Figure 23:
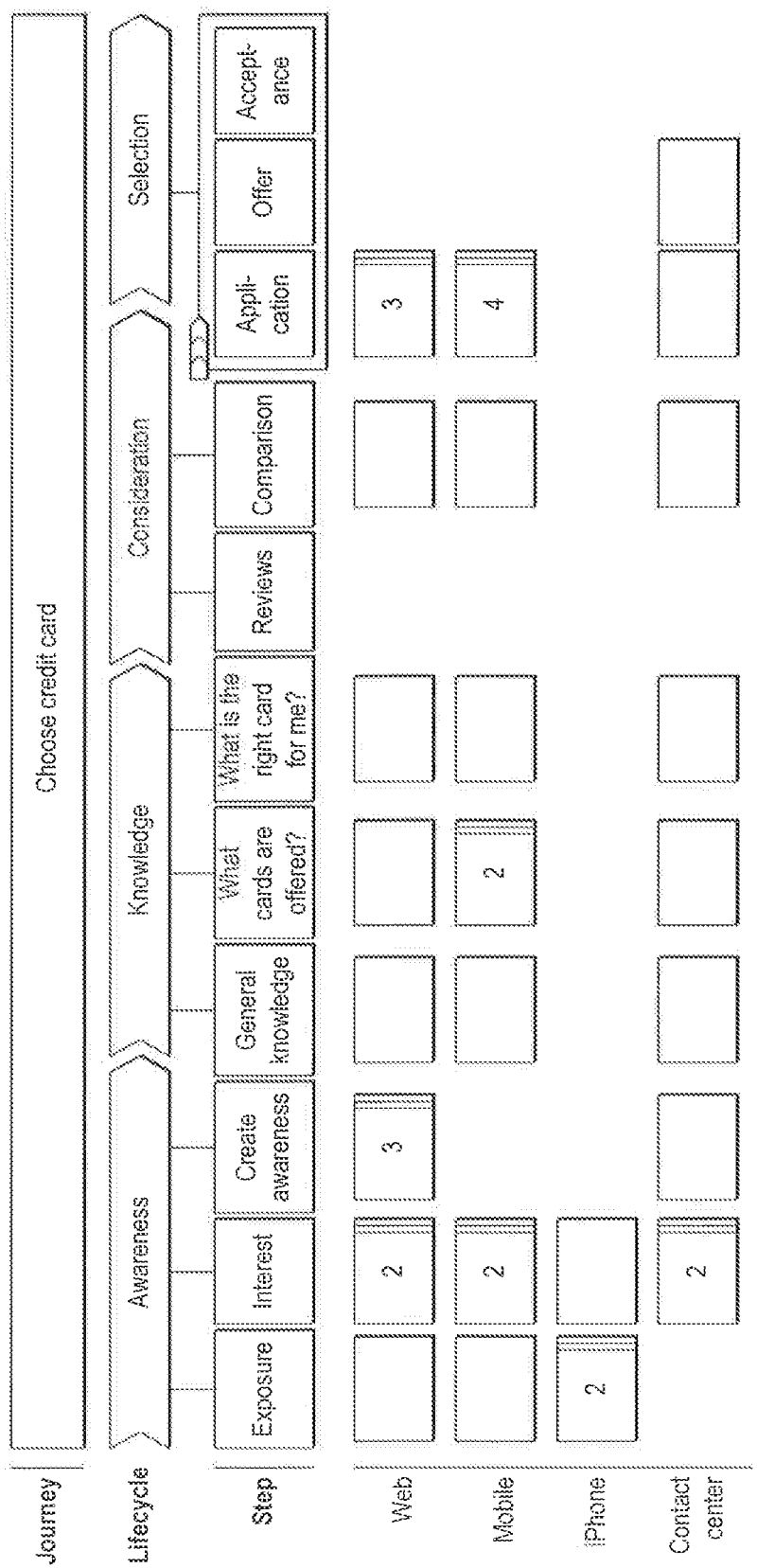
FIG. 23 depicts the number of user interactions in web, mobile iPhone® and call center channels.
Figure 24:
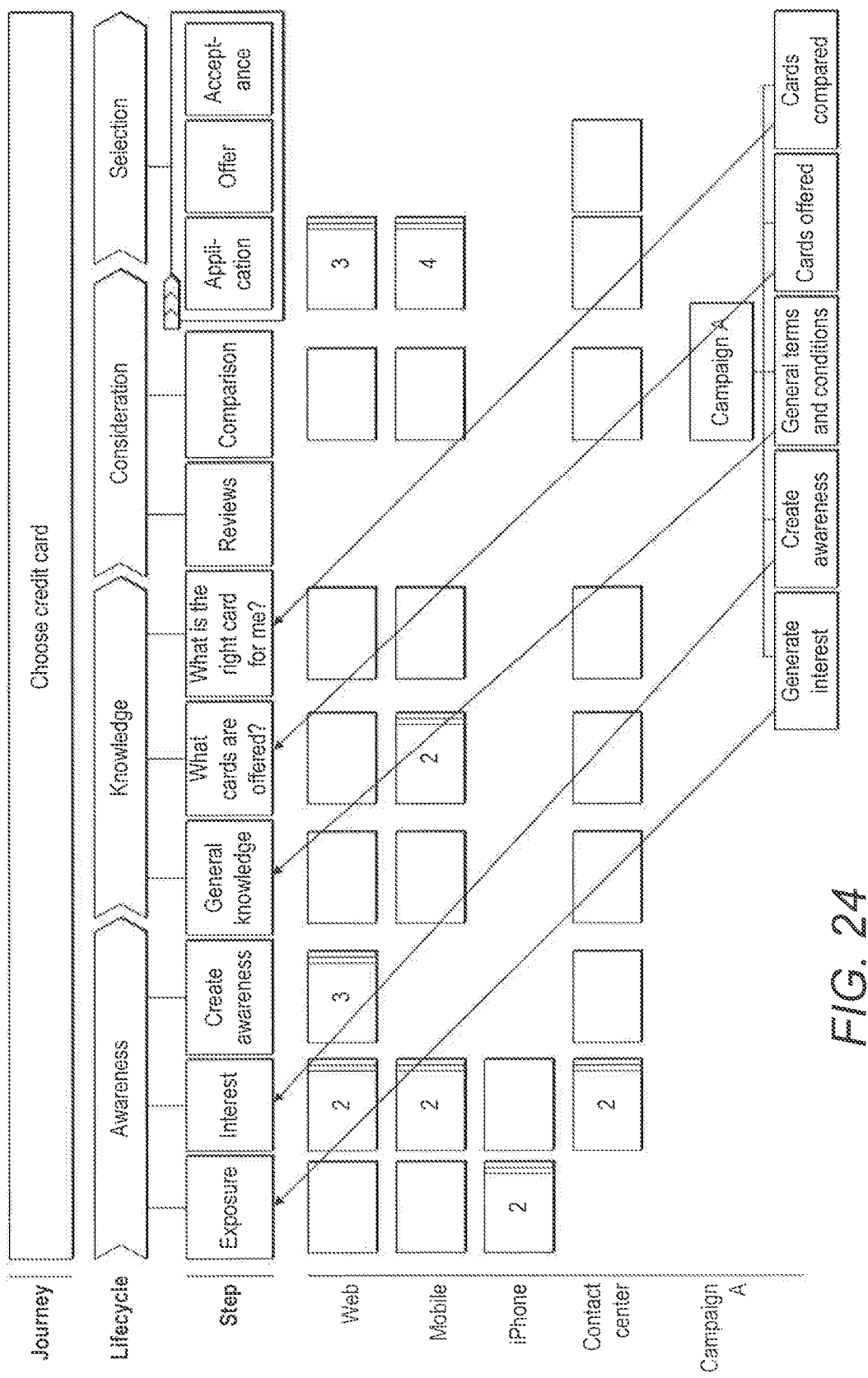
FIG. 24 depicts a plurality of mappings between a user's activities on a campaign and journey steps.
Figure 25:
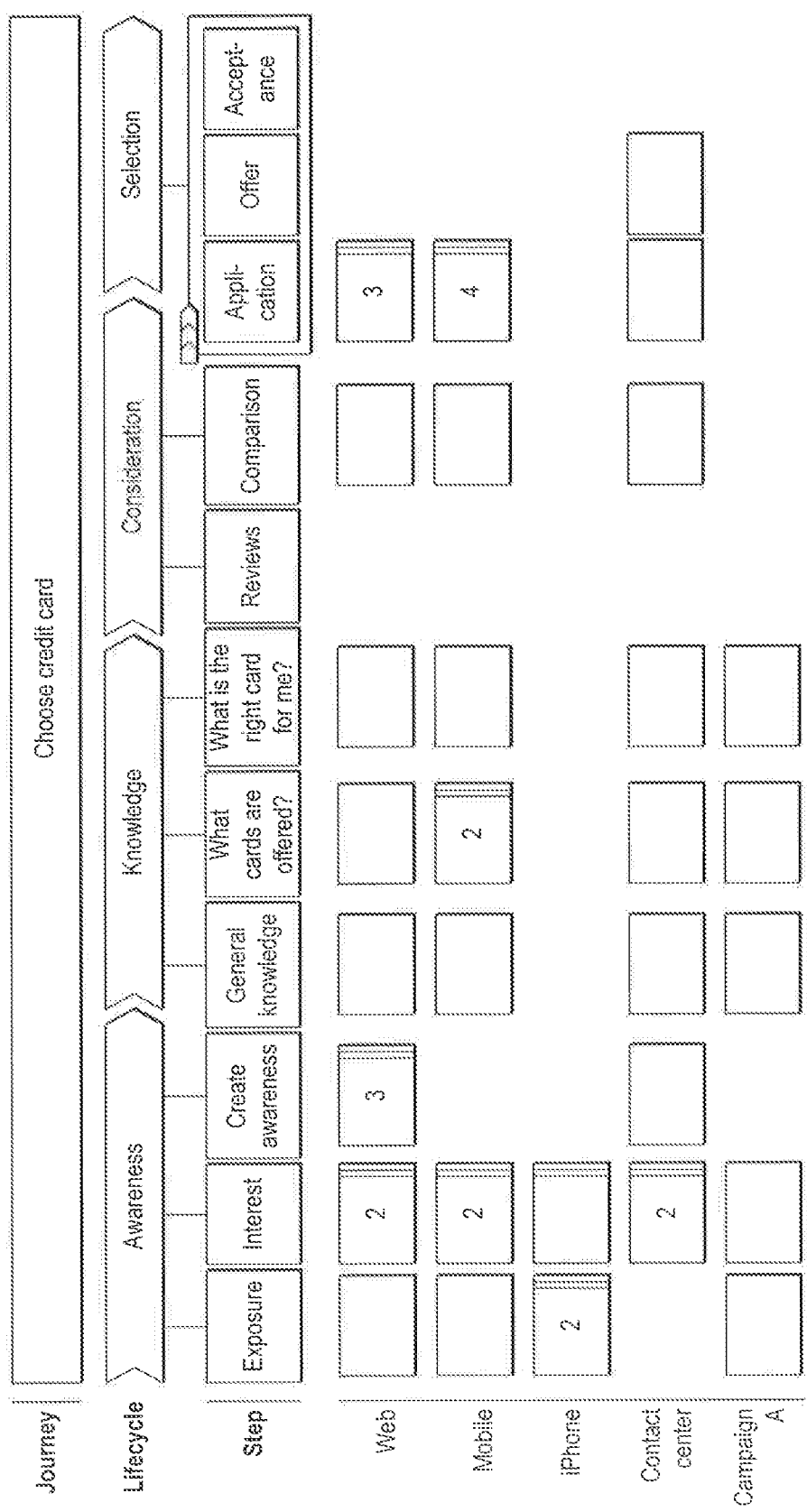
FIG. 25 depicts number of mappings between a user's activities and various channels.

FIG. 16 shows several mappings between several monitored activities and corresponding journey steps, when the user is on a "Choose Credit Card" customer journey on a web application through the ABC Co website. The plurality of arrows of FIG. 16 representing mappings between activities occurring at different moments in time and different journey steps can be created sequentially. The activities happening earlier in the history of the user's activities (higher level in the hierarchy of the touch-points map) may be linked to the earlier journey steps. For instance the activity "Cards" 304 which may happen historically earlier than the activity "view all cards" 305 is mapped to the journey step "exposure" 1301 which is earlier than the journey step "interest" 1302 linked to "View all Cards" 305. However some earlier activities may be linked to later journey steps. For instance the activity of "compare cards" 307 is linked to the late journey step of "comparison" 1308 via linking arrow 1603 whilst the activity of reading "terms and conditions" 308 which usually occurs later in the chronology of activities can be linked to an earlier step of awareness 901. At a certain point in time, a user's activity may be mapped to one journey step and as the user changes activity, the later activity may be mapped to another journey step. Hence, the user's change of activity may correspond to the user's movement along journey steps. Accordingly, a mapping would be linking a user's activity to a configured journey step for a time period until the user moves to a new activity which may then be linked to a different configured journey step. For a given user, different user's activities may be mapped to the same journey step. Such mappings may be created when the mapping rules are not refined enough to distinguish links from different activities.

It will be appreciated that the mappings of various user's listened activities and journey steps may occur dynamically in real time as the user performs different actions. For instance, referring to FIG. 16, if the user performs an act of "viewing all cards" 306 available on the ABC Co web site, the method infers the position of the user in the journey. Accordingly, the method creates a link 1602 associating this activity to the journey step "what cards are offered" 1305 of the lifecycle step "Knowledge" 902. As indicated above, this association can be done by comparing the attributes of the activity of the user with the description of the configured journey step. If, thereafter the user performs another act of "comparing these cards" 307, the method according to the invention creates a new link 1603 between the action of the user 307 and the journey step 1308. Once the new link 1603 is created, the old link 1602 may be deleted. Alternatively the previous link may be flagged as being outdated or obsolete as not reflecting a link with the customer's current's actions. Creating and deleting/outdating links may be executed dynamically through the implementation of a structure such as a dynamic linked list of associations.

The length of time of a created association can be used to infer the user's behaviour. For instance, if it is indicated that a user stays within a journey step for a long time (e.g 12 hours), it can be inferred that the user has dropped off the journey. A predetermined time duration (not necessarily 12 hours) may be used to identify a drop-off in the journey.

In one embodiment, an association between a user's activity and a journey step comprises a predefined timer. Upon creation of an association, the association remains valid until the timer expires or until the user's monitored activity changes. When the user's monitored activity changes, the journey map may be updated to reflect the fact that the user may not be associated with the same journey step anymore. The fact that the user stays in a journey step for a long time may provide an indication as to what sort of contents could be provided to the user at that stage to drive him along the journey. This information can be useful to organisation wanting to help the users along a purchase journey for example.

If after expiry of this period of time, there is no new association created, it may be inferred that the user has dropped off the previous journey step. Accordingly, the association can be removed if the association has not been renewed before the expiry of the time period.

As indicated before, the association between a user's monitored activity and a journey step occurs dynamically by comparing in real time the attributes of the user's activity and the attributes of the preconfigured journey step. However the association may also be preconfigured statically such that as soon as the user performs the predefined activity the association to the predefined journey step is created.

In one embodiment of the present invention, the mapping between a monitored activity and a journey step may be represented by a sign on a graphical interface. For instance in FIG. 16 an arrow is used to represent the mappings. This representation may appear in real time on the interface when the user performs an act which can be mapped to a configured journey step. As the user acts, the progress of his activities will be shown in real time along the journey. For instance considering a Gold card map journey, when a given customer visits a Gold card web site, a sign may appear on the awareness step of the Gold card journey indicating that a customer is aware of the Gold card. When the user performs an activity, which is not associable to a journey step, there will be no mapping from that activity and therefore no representation of linkage between the user's activity and any journey step.

In an embodiment of the invention, where the user's monitored activity is not associated with any journey step, the lack of association may be signalled. Indicating a lack of association between a monitored user activity and any journey step may be exploited by an organisation. For instance an organisation may use this information to decide to pull relevant contents for the user to help the user enter into a journey at a particular step.

For each customer, information regarding the customer journey and information regarding the user's activity may be recorded on a storage device 1430. Moreover for each customer, the mappings between the customer activity and the configured journey steps may be stored on the storage device 1430. Additionally other information regarding the lack of mapping between a customer's activity and any journey step may be recorded on device 1430. The customer information stored on the device 1430 can be accessible for decision making. For instance, customer information may be computed to reach decisions on how to entice a customer to move into a particular step along a journey. In FIG. 14, such computation taking place in Engine 1415 can result in a recommendation 1411. The recommendation may be sent in the form of an instruction for enticing the user to move into a journey step along the journey. The recommendation 1411 may also be some relevant media content the user may not have been aware of or an advertisement for a particular product. The recommendation can be sent to the user whose activities are monitored on behalf of an organisation wanting to influence the user on his journey. FIG. 14 further depicts in arrow 1409 the retrieval of a customer current journey position for feeding an Engine 1415 which runs a decision based algorithm. The journey history can also be used to reach a decision regarding the customer progress along his journey. For instance the sequence of a user previously visited steps can feed the decision based algorithm to reach a decision regarding the best way or the most appropriate way to progress a customer along his journey. The recording of a sequence of steps indicating the history of a user's journey may then be used for decisioning in arrow 1409. The stored activity and journey information as well as the mapping information can be collected to compute journey analytics 1408 for various services 1407.

Figure 26:
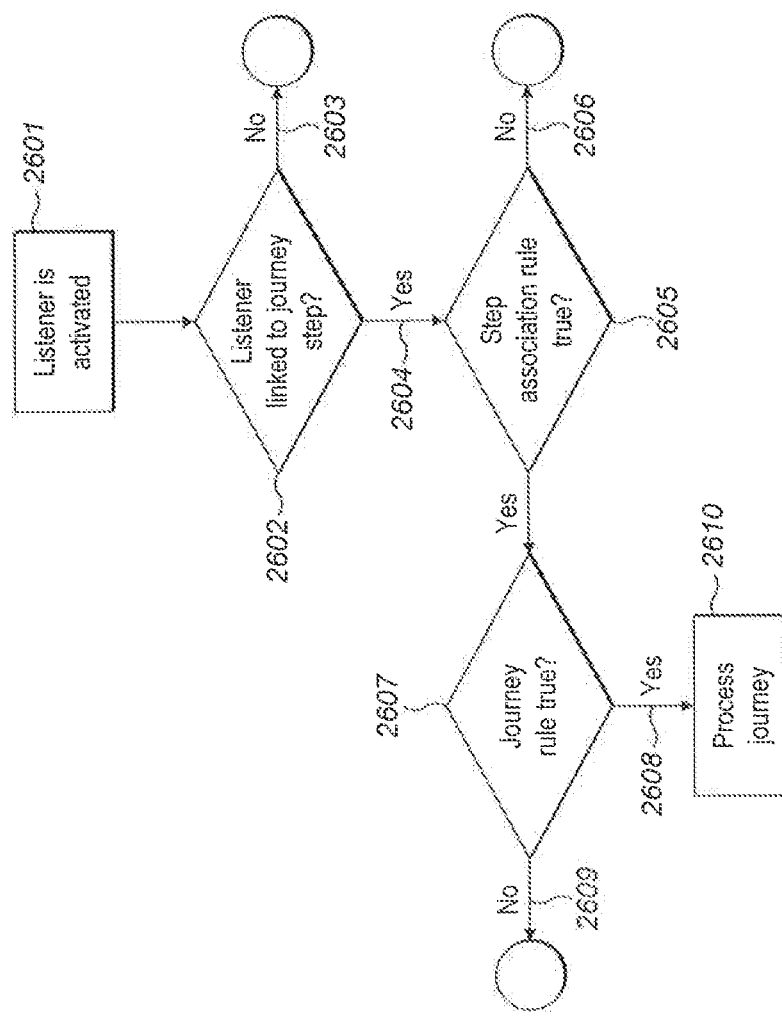
FIG. 26 is a flow diagram describing a method of one embodiment of the invention.

The association between a user's monitored activity and a journey step can be defined by arbitrary rules. These rules can be defined as a way of checking whether various conditions are met for a customer journey to progress. FIG. 26 emphasizes the purpose of "rules" in journey decision-making. In the block 2601 of FIG. 26 the user's activity is being listened to via activated listener 333. The check step 2602 corresponds to checking whether a listened activity is linked to a particular journey step. If there is no linkage or mapping between the listened activity and a journey step (step 2603), a signal in the form of a recommendation may be sent as shown in arrow 1411 of FIG. 14. Alternatively, if a user's listened activity is mapped to a particular journey step, the rule defining this association is checked 2605. Upon positive verification of this association rule another check step 2607 is entered whereby a journey rule is checked. A journey rule is an eligibility rule that determines if a set of circumstances are true. So, in one example, both the association of a "listening activity" to a journey step and the journey eligibility has to be true for a customer to be advanced in the journey. If the journey rule is true then the customer can progress along the journey 2610. Verifying a journey rule can consist in checking whether a customer has visited certain steps or a particular sequence of steps in his journey history. The outcome of such verification results as shown by arrow 2608 of FIG. 26 in a particular decision to progress the customer along his journey. The decision attained may be the best decision for the customer given his journey history.

FIGS. 18, 20, 22, 24 represent mappings between listened user's activities and journey steps. The user's activities are monitored by listeners situated at different touch-points of the touch-point maps of FIGS. 3, 4, 5, 6 and 7. The activities at different touch-points are monitored over various channels or media including the Web, Mobile, iPhone, contact/call center and campaign A.

FIGS. 17, 19, 21, 23, 25 represent the number of monitored activities which were mapped into steps of the customer journey in various channels. For instance in FIG. 17, it is shown that two activities in a web channel were mapped to the sub-step "Interest" 1302 of the "Awareness" step and three activities 1702 in a web channel were associated to the "Create Awareness" 1303 sub-step of the "Awareness" step 901. These activities are related to the banking application and more particularly to the "choose credit card" journey. This data may be stored in a storage device 1430 to be further used as analytics data 1403.

Analytics data may provide some information to feed the user's AEP. As indicated above a user's AEP contains attributes describing the behaviour of the customer, and these attributes can be gathered from different places.

A certain number of metrics also called "Key Performance Indicators" or KPIs can be monitored as the user's activity is monitored along the journey. In an embodiment of the invention, KPIs monitored are recorded along with other user's behaviour information. An example of KPI is the "number of drop-offs" indicating the number of users who have left a journey without completing the journey. The availability of these KPIs may be useful to some organisations wishing to take decisions based on the user's behaviours. For example, some content providers may use them to provide appropriate contents at the right stage to prevent large numbers of drop-offs. Other KPIs can include for example the number of "password changes" that a user may have requested along a journey etc. The user's behaviours include the user's journey history. The behaviours can be a collection of users' journey histories. Where a user is viewed in a group of users, the decision to progress that particular user along his journey may depend on his own journey history but can also depend on the journey histories of the other users.

The measured indicators or KPIs can be used to diagnose problems occurring on a journey. These monitored KPIs can therefore be used to correct mistakes and/or to optimise the performance of a journey. For example, entering repetitively a password in a short time frame without going to the next step may indicate an incorrect web page setting, or updates that may be needed to the web page to keep the user in the journey.

Monitoring the KPIs over a period of time helps organisations in their decision making. For instance an organisation that identifies that a certain percentage of people who arrive on a certain step in a certain channel in the last few days are not continuing in their journey may indicate that the web site needs improvements or changes. The monitoring of these KPIs over time can be done by means of a graphical interface which is linked to an environment where the KPIs that are monitored are analysed.

The context including information regarding what other users are doing while a user is moving along his journey can be used to make relevant decisions in driving the user. The context may include the histories of other users' journeys. In such a context, a decision to progress a user along his journey could be based on his own journey history and/or on the journey histories of some or all the others users. The decisions may be adapted as the context evolves. For instance a decision may be timely in a certain context but may be inappropriate when the context changes. Journey context information may be combined to existing analytics data for facilitating the decision-making and to optimise decisions. Decision-making can occur as the journey map is being updated in real time. A user may be in several different journeys simultaneously and combining existing analytics with real time journey information can facilitate making decisions for a user in different journeys.

Figure 27:
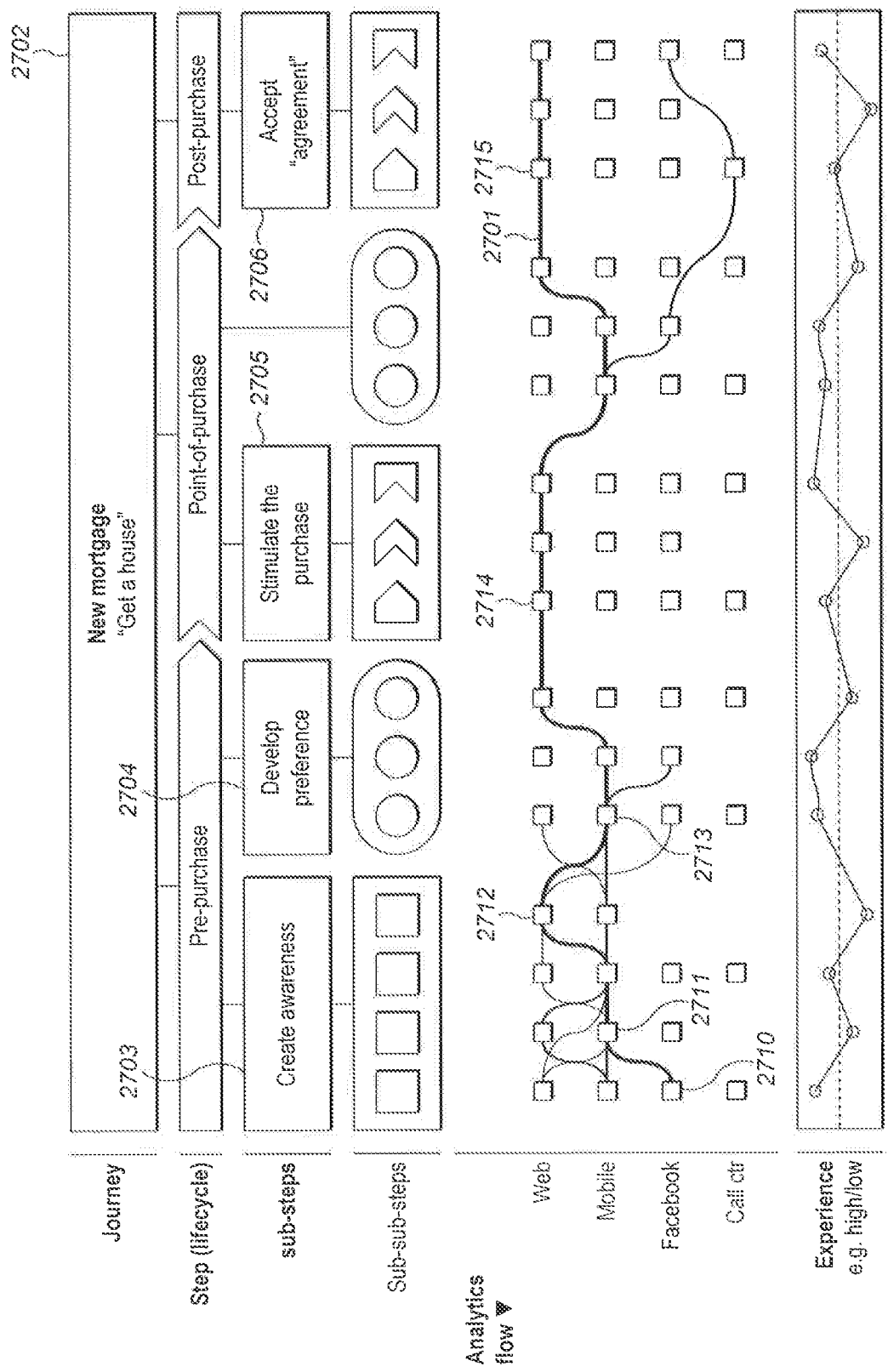
FIG. 27 depicts a data analytics representation of information of several users' paths that may be generated according to one embodiment based on interactions of the several users.
Figure 28:
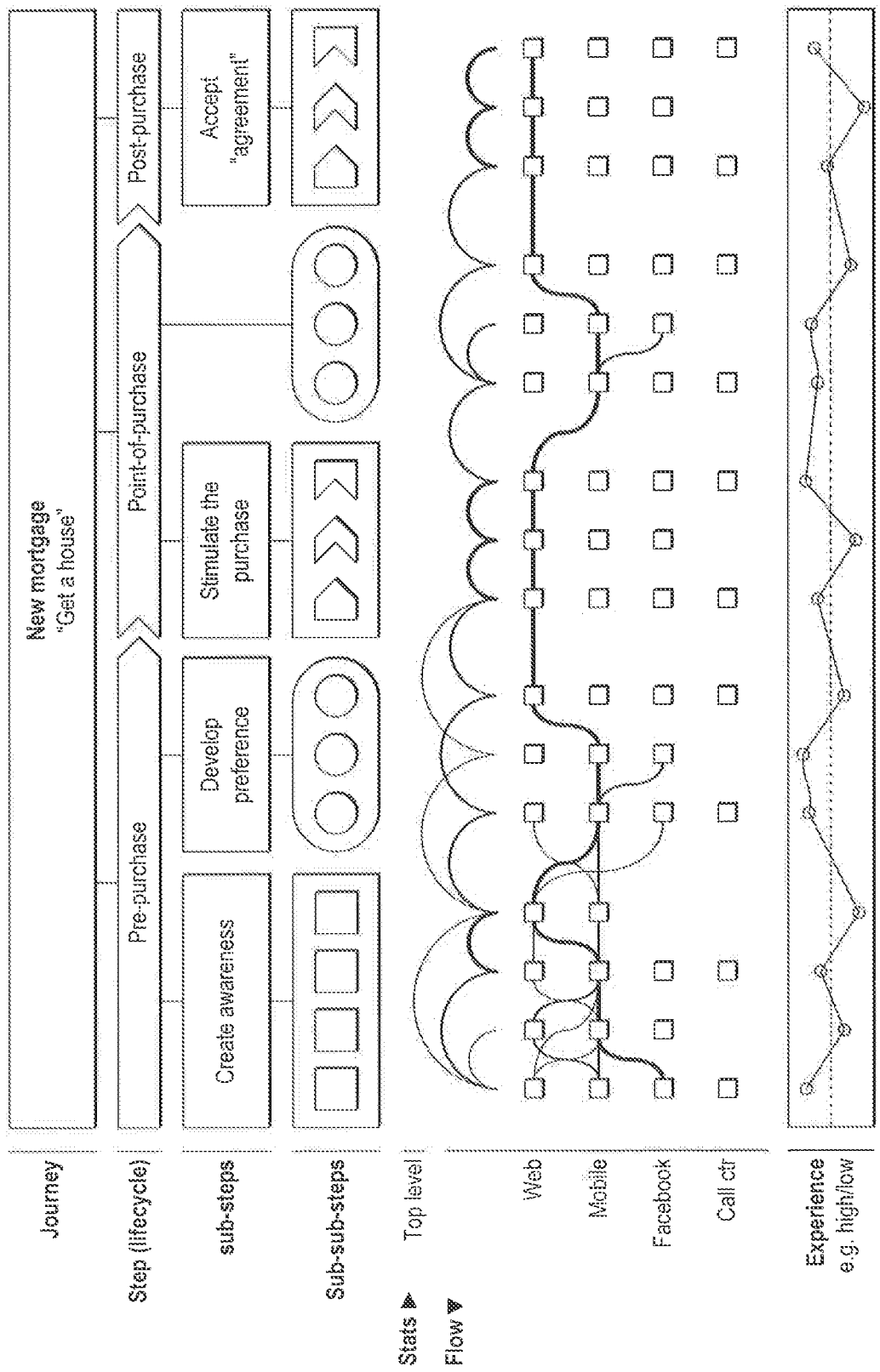
FIG. 28 depicts further information that may be provided relating to the data analytics representation shown in FIG. 27

FIGS. 27, 28 show a graphical representation of the data analytics that can be provided for several users' journeys as monitored by listeners across various channels (Web, Mobile, Facebook, Call Centre).

These figures also indicate the links between consecutive points taken by the users as they journey along a path. The information relating to the points of the path and the links between consecutive points is stored and the graphical representation can be generated in real time (dynamically) as the user performs an act which is monitored or at a later stage. The graphical representation of the preconfigured journey map together with a user's path allows at least a visual mapping between the points of the user's path and the configured journey steps. This is a useful way for the organisation that is monitoring journey progress to display all the information that has been gathered over a particular time frame for the various steps of a journey for a plurality of users.

The representation of these different paths may be represented according to various rules and policies. For instance FIG. 27 may represent the paths of people of the same household advancing through the "new Mortgage" 2702 journey.

A user may be starting his "New Mortgage" journey 2702 on Facebook® 2710, for example, through an advertisement. A listener would be created on an advertisement in Facebook. While he is developing awareness of the product 2702, he switches between his mobile and the Web 2711, 2712. He then enters the "Develop Preference" step 2704 by using his mobile 2713. The user finally enters the "Stimulate the Purchase" 2705 step via a web browser 2714 before switching to a Mobile application. As he journeys along the "Accept Agreement" phase 2706, he keeps using the Web application. Listeners 333 are provided at each touch-point on the multiple channels such that information from the various channels can be gathered and acted upon accordingly.

In FIGS. 27 and 28, the association between the different journey moves and the configured journey steps is apparent via the graphical user interface representing, in real time, the evolution of the user.

The graphical representation of the journeys of a single or preferably multiple users can be generated and displayed on a single graphical user interface to allow a viewer to easily identify drop-offs as well as popular journeys that lead to completion. This can be represented, for example, by the colour or thickness of the path representation of a particular journey being more predominant compared to other journeys and this is shown in FIG. 27 where the thickest line represents the most frequented or popular journey which has led to completion (i.e post-purchase in this embodiment).

Figure 29:
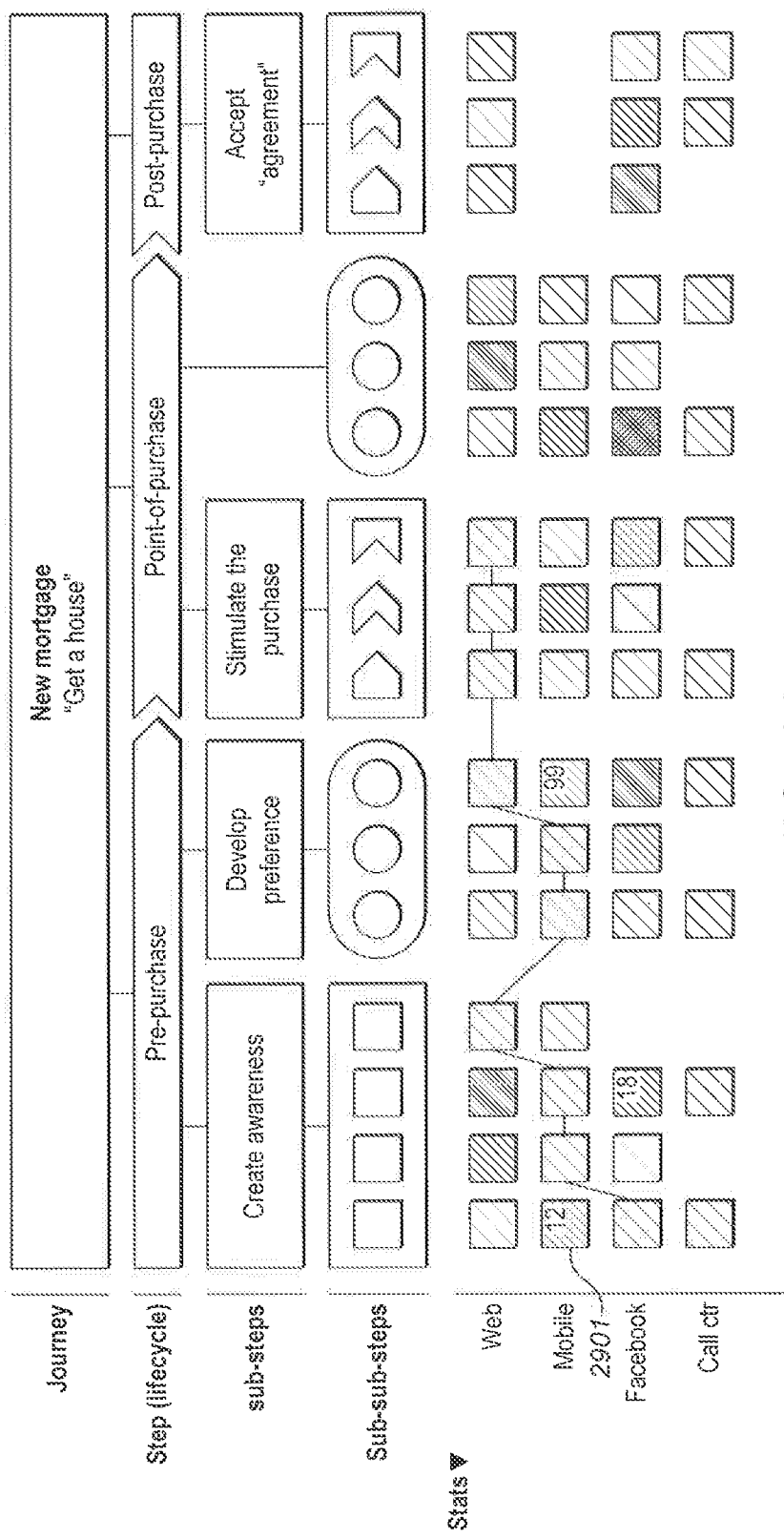
FIG. 29 depicts another representation that may be generated based on the users' paths shown in FIG. 27 and displays the number of users' interactions in different channels.

FIG. 29 represents additional information on the journey map. For instance, the block 2901, indicates the number of users having been mapped to the "Create Awareness" sub-step while using their mobile phone. Such information may be obtained through analytics and displayed on a graphical user interface such as that of FIG. 29.

It will be appreciated that the invention is not limited to the particular journeys described in the foregoing examples and the different types of journeys can be mapped depending on the requirements of the organization.

As will be appreciated by one skilled in the art, aspects of the present invention may be embodied as a system, method, computer program product or computer program. Various aspects of the invention may take the form of a hardware embodiment, a software embodiment or an embodiment combining software and hardware aspects. Various aspects of the invention are described with reference to diagrams and/or flowcharts. It will be understood that each diagram and/or flowchart can be implemented by computer program instructions. These computer program instructions can be stored in a computer readable medium for controlling a computer or a computing apparatus such that the instructions stored in the computer readable medium implement the function specified in the diagrams and/or flowcharts.

In addition to the embodiments of the invention described in detail above, the skilled person will recognize that various features described herein can be modified and combined with additional features, and the resulting additional embodiments of the invention are also within the scope of the accompanying claims.

The invention claimed is:

1. A computer-implemented method comprising:
   creating a journey map representative of a user journey comprising at least one journey step, the journey being a sequence of interactions with an organisation;
   activating a listener associated with the at least one journey step by initiating execution of a monitoring application on at least one device associated with the user or the organization;
   monitoring a user's activity using the activated listener;
   providing information relating to the user's activity for associating the user's monitored activity to the at least one journey step;
   checking whether the user's monitored activity can be associated with the at least one journey step by comparing attributes of the user's activity and attributes of the at least one journey step;
   associating the user's activity to the at least one journey step, if the user's monitored activity can be associated with the at least one journey step;
   updating the journey map, using a dynamic linked list of associations, to reflect a mapping between the user's activity and the at least one journey step;
   enabling real time display of the updated journey map, on a graphical user interface on the at least one device associated with the user or the organisation; and
   adjusting the attributes of the at least one journey step based on the updated journey map.

2. The method of claim 1, wherein associating the user's activity to the at least one journey step comprises linking on the journey map a representation of the user's activity with the journey step associated with the user's activity.

3. The method as claimed in claim 1, wherein if the user's monitored activity is not associated with a journey step, sending a signal for indicating the lack of association between the user's activity and the at least one journey step.

4. The method as claimed in claim 3, wherein upon detection of a lack of association between a user's activity and the at least one journey step, consulting the user's profile for directing the user into an activity that will be associable with the at least one journey step.

5. The method as claimed in claim 4, wherein directing the user comprises selecting an attribute of the user's profile to identify activity information for the user, and for requesting and retrieving identified information.

6. The method as claimed in claim 1, wherein the listener is a software application capable of capturing the user's actions across a plurality of media and/or channels.

7. The method as claimed in claim 1, wherein monitoring a user's activity comprises capturing the user's action at a touch-point.

8. The method as claimed in claim 1, wherein information relating to the user's activity is incorporated into a user's profile.

9. The method as claimed in claim 1, wherein information relating to the user's monitored activity and information of context from data analytics are combined for associating the user's monitored activity to the at least one journey step.

10. The method as claimed in claim 1, wherein the association between a user's activity and the at least one journey step is valid until a predetermined duration of time expires and/or until the user's monitored activity changes.

11. The method as claimed in claim 10, further comprising removing the association when the predetermined duration of time expires and/or the user's monitored activity is not changed or renewed.

12. The method as claimed in claim 1, further comprising inferring a user's position in the journey by comparing the user's profile information including the user's monitored activity with attributes of the at least one journey step.

13. The method as claimed in claim 1, wherein the graphical user interface displays the journey paths of a plurality of users.

14. A computer-implemented system comprising:
   means for creating a journey map having at least one journey step;
   means for activating a listener associated with the at least one journey step by initiating execution of a monitoring application on at least one device associated with the user or the organisation;
   means for monitoring a user's activity using the activated listener;

means for checking whether the user's monitored activity can be associated with the at least one journey step by comparing attributes of the user's activity and attributes of the at least one journey step;

means for associating the user's activity to the at least one journey step;

means for updating the journey map, using a dynamic linked list of associations, to reflect a mapping between the user's activity and the at least one journey step;

means for enabling real time display of the updated journey map on a graphical user interface; and means for adjusting the attributes of the at least one journey step based on the updated journey map.

15. A computer program product comprising a computer readable storage medium having computer-readable program code embodied therewith, the computer readable program code configured to carry out the method of claim 1.

* * * * *